United States Patent
Brevoort et al.

(10) Patent No.: US 12,373,756 B2
(45) Date of Patent: Jul. 29, 2025

(54) CONTEXTUAL WORKFLOW BUTTONS

(71) Applicant: Salesforce, Inc., San Francisco, CA (US)

(72) Inventors: Michael Brevoort, Littleton, CO (US); Brad Harris, Castle Rock, CO (US); Melissa Aubrie Chan, Hayward, CA (US)

(73) Assignee: Salesforce, Inc., San Francisco, CA (US)

( * ) Notice: Subject to any disclaimer, the term of this patent is extended or adjusted under 35 U.S.C. 154(b) by 410 days.

(21) Appl. No.: 17/744,064

(22) Filed: May 13, 2022

(65) Prior Publication Data

US 2023/0368105 A1    Nov. 16, 2023

(51) Int. Cl.
| G06Q 10/06 | (2023.01) |
| G06F 3/0482 | (2013.01) |
| G06F 3/0484 | (2022.01) |
| G06Q 10/0633 | (2023.01) |

(52) U.S. Cl.
CPC ....... *G06Q 10/0633* (2013.01); *G06F 3/0482* (2013.01); *G06F 3/0484* (2013.01)

(58) Field of Classification Search
None
See application file for complete search history.

(56) References Cited

U.S. PATENT DOCUMENTS

| 8,527,287 | B1 | 9/2013 | Bhatia |
| 8,892,446 | B2 | 11/2014 | Cheyer et al. |
| 10,592,867 | B2 | 3/2020 | Rosenberg |
| 10,698,706 | B1 | 6/2020 | Rabe et al. |
| 10,728,781 | B2 | 7/2020 | Timmons et al. |
| 10,768,952 | B1 | 9/2020 | Watson et al. |
| 11,140,203 | B1 | 10/2021 | Butterfield et al. |
| 11,343,253 | B2 | 5/2022 | Timmons et al. |
| 11,425,584 | B2 | 8/2022 | Timmons et al. |
| 11,481,236 | B1 | 10/2022 | Weiss et al. |
| 11,494,741 | B1 | 11/2022 | Schemers et al. |
| 11,558,210 | B2 | 1/2023 | Suhail et al. |
| 11,947,353 | B1* | 4/2024 | Herbach ................ G07C 5/008 |
| 2007/0157118 | A1* | 7/2007 | Wuttke ................ G06F 16/957 715/764 |
| 2009/0125796 | A1 | 5/2009 | Day et al. |

(Continued)

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.

(Continued)

*Primary Examiner* — Alan Torrico-Lopez
(74) *Attorney, Agent, or Firm* — Lee & Hayes, P.C.

(57) ABSTRACT

Media, methods, and systems are provided for contextual automation within a group-based communication system using buttons persisted within a virtual space of the group-based communication system. The buttons are configured to initiate one or more workflows that perform one or more external or internal operations contextually based on one or more contextual parameters associated with the buttons. When actuated, the buttons call a specific workflow and pass the one or more contextual parameters to the workflow.

20 Claims, 27 Drawing Sheets

(56) References Cited

U.S. PATENT DOCUMENTS

| | | | |
|---|---|---|---|
| 2010/0094822 A1* | 4/2010 | Kelapure | G06F 16/13 |
| | | | 707/E17.015 |
| 2011/0135083 A1 | 6/2011 | Lingafelt et al. | |
| 2013/0154958 A1 | 6/2013 | Clavin et al. | |
| 2013/0198288 A1 | 8/2013 | Jones et al. | |
| 2015/0264023 A1 | 9/2015 | Reno | |
| 2018/0103073 A1* | 4/2018 | Rosenberg | H04L 61/4555 |
| 2018/0287982 A1 | 10/2018 | Draeger et al. | |
| 2019/0232168 A1 | 8/2019 | Benedetto et al. | |
| 2020/0351566 A1 | 11/2020 | Yelton | |
| 2020/0410583 A1 | 12/2020 | Hart et al. | |
| 2021/0118325 A1 | 4/2021 | Gupta et al. | |
| 2021/0149688 A1 | 5/2021 | Newell et al. | |
| 2021/0182087 A1 | 6/2021 | Park et al. | |
| 2021/0365806 A1* | 11/2021 | Sumanth | G06N 20/00 |
| 2022/0109707 A1 | 4/2022 | Butterfield et al. | |
| 2022/0147197 A1 | 5/2022 | Tross et al. | |
| 2022/0184452 A1* | 6/2022 | Valente | A63B 21/4029 |
| 2022/0278989 A1 | 9/2022 | Timmons et al. | |
| 2022/0398219 A1* | 12/2022 | Sullivan | G06F 9/44505 |
| 2023/0246862 A1 | 8/2023 | Boucheron et al. | |
| 2024/0121124 A1 | 4/2024 | Abraham | |
| 2024/0176630 A1 | 5/2024 | Timmons et al. | |
| 2024/0283670 A1 | 8/2024 | Abraham | |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of- defeat.html>. (dated May 28, 2014) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

PCT Patent Application PCT/US2023/021928 International Search Report and Written Opinion of the International Searching Authority issued Aug. 30, 2023.

U.S. Appl. No. 18/071,350, Non-Final Office Action dated Jul. 18, 2023.

Office Action for U.S. Appl. No. 18/651,686, dated Jan. 3, 2025, Abraham, "Scheduled Synchronous Multimedia Collaboration Sessions," 6 pages.

Office Action for U.S. Appl. No. 18/071,350, mailed on Jan. 12, 2024, Andrew Timmons, "Machine Learning for Targeting Help Content," 53 pages.

Office Action for U.S. Appl. No. 17/960,599, mailed on Oct. 6, 2023, Vineeth John Abraham, "Scheduled Synchronous Multimedia Collaboration Sessions," 15 pages.

\* cited by examiner

FIG. 2B

| Event ID | Guest | Attending | Item |
|---|---|---|---|
| E1 | J. Smith | Accepted | Pizza |
| E1 | B. Goodman | Accepted | Soda |
| E1 | C. Simon | Accepted | Chips |

720 — 722 Event ID, 724 Guest, 726 Attending, 728 Item

FIG. 7C

CONTEXTUAL WORKFLOW BUTTONS

TECHNICAL FIELD

Embodiments of the invention generally relate to automated workflows. More specifically, embodiments of the invention relate to buttons for triggering automated workflows within a group-based communication system.

Automated workflows have been used to perform various action steps within, for example, a group-based communication system. However, these workflows are not applied contextually based on the context where the workflows are initiated. As such, the workflows may need to be manually edited before being applied to different contextual locations of the group-based communication system. Further, existing workflows lack the ability to dynamically update various display elements within the group-based communication system. Accordingly, what is needed is a way to apply workflow steps based on contextual parameters.

SUMMARY

Embodiments of the invention address the above-identified need by providing media, methods, and systems for contextual automation within a group-based communication system in which buttons are added to a virtual space within the group-based communication system. The buttons retrieve contextual parameters associated with the virtual space and user interactions that are passed to automated workflows initiated by the respective buttons. Accordingly, steps performed by the automated workflows may be carried out contextually based on the contextual parameters collected by the buttons.

In some aspects, the techniques described herein relate to one or more non-transitory computer-readable media storing computer-executable instructions that, when executed by at least one processor, perform a method of contextual automation within a group-based communication system, the method including causing display of a workflow button within a virtual space of the group-based communication system to a user of the group-based communication system, at least one display parameter of the workflow button being determined based on a context associated with the virtual space, receiving, from the user, an actuation of the workflow button, responsive to the actuation of the workflow button, receiving a plurality of contextual parameters associated with the workflow button including a user identifier associated with the user and contextual data associated with the virtual space, initiating an associated workflow associated with the workflow button to perform one or more automated operations based on the plurality of contextual parameters, receiving a response indicative of a completion of the associated workflow, and updating the workflow button within the virtual space of the group-based communication system based on the received response indicative of the completion of the associated workflow.

In some aspects, the techniques described herein relate to one or more non-transitory computer-readable media, the method further including responsive to performing an operation of the one or more automated operations, initiating an additional workflow to perform one or more additional operations, receiving a completion confirmation associated with the additional workflow, and performing a further operation of the one or more automated operations dependent on the completion confirmation associated with the additional workflow.

In some aspects, the techniques described herein relate to one or more non-transitory computer-readable media, the method further including responsive to performing an operation of the one or more automated operations, causing display of a new workflow button within the virtual space, wherein the new workflow button is configured to initiate an additional workflow.

In some aspects, the techniques described herein relate to one or more non-transitory computer-readable media, the method further including responsive to performing an operation of the one or more automated operations, creating a second virtual space based on the plurality of contextual parameters within the virtual space, wherein the second virtual space includes a direct message, a channel, a collaborative document, or a collaboration session.

In some aspects, the techniques described herein relate to one or more non-transitory computer-readable media, the method further including causing display of the workflow button within a second virtual space to a second user of the group-based communication system, the at least one display parameter of the workflow button in the second virtual space being different from the at least one display parameter in the virtual space, responsive to the actuation of the workflow button in the second virtual space, retrieving the plurality of contextual parameters associated with the actuation of the workflow button including a second user identifier associated with the second user and a second contextual identifier indicative of the second virtual space, determining a second workflow for the workflow button based on the workflow button and the plurality of contextual parameters, the second workflow being different from the associated workflow, and initiating the second workflow.

In some aspects, the techniques described herein relate to one or more non-transitory computer-readable media, the method further including responsive to performing an operation of the one or more automated operations, storing information indicative of a first one of the plurality of contextual parameters in a storage location determined based on a second one of the plurality of contextual parameters.

In some aspects, the techniques described herein relate to one or more non-transitory computer-readable media, the method further including responsive to performing an operation of the one or more automated operations, updating the virtual space to reflect the actuation by the user of the workflow button.

In some aspects, the techniques described herein relate to a method for contextual automation within a group-based communication system, the method including causing display of a workflow button within a virtual space of the group-based communication system to a user of the group-based communication system, at least one display parameter of the workflow button being determined based on a context associated with the virtual space, receiving, from the user, an actuation of the workflow button, responsive to the actuation of the workflow button, receiving a plurality of contextual parameters associated with the workflow button including a user identifier associated with the user and contextual data associated with the virtual space, initiating an associated workflow associated with the workflow button to perform one or more automated operations based on the plurality of contextual parameters, receiving a response indicative of a completion of the associated workflow, and updating the workflow button within the virtual space of the group-based communication system based on the received response indicative of the completion of the associated workflow.

In some aspects, the techniques described herein relate to a method, further including responsive to performing an operation of the one or more automated operations, initiating an additional workflow to perform one or more additional operations, receiving a completion confirmation associated with the additional workflow, and performing a further operation of the one or more automated operations dependent on the completion confirmation associated with the additional workflow.

In some aspects, the techniques described herein relate to a method, further including responsive to performing an operation of the one or more automated operations, causing display of a new workflow button within the virtual space, wherein the new workflow button is configured to initiate an additional workflow.

In some aspects, the techniques described herein relate to a method, further including responsive to performing an operation of the one or more automated operations, creating a second virtual space based on the plurality of contextual parameters within the virtual space, wherein the second virtual space includes a direct message, a channel, a collaborative document, or a collaboration session.

In some aspects, the techniques described herein relate to a method, further including causing display of the workflow button within a second virtual space to a second user of the group-based communication system, the at least one display parameter of the workflow button in the second virtual space being different from the at least one display parameter in the virtual space, responsive to the actuation of the workflow button in the second virtual space, retrieving the plurality of contextual parameters associated with the actuation of the workflow button including a second user identifier associated with the second user and a second contextual identifier indicative of the second virtual space, determining a second workflow for the workflow button based on the workflow button and the plurality of contextual parameters, the second workflow being different from the associated workflow, and initiating the second workflow.

In some aspects, the techniques described herein relate to a method, further including responsive to performing an operation of the one or more automated operations, storing information indicative of a first one of the plurality of contextual parameters in a storage location determined based on a second one of the plurality of contextual parameters.

In some aspects, the techniques described herein relate to a method, further including responsive to performing an operation of the one or more automated operations, updating the virtual space to reflect the actuation by the user of the workflow button.

In some aspects, the techniques described herein relate to a system including at least one processor and at least one non-transitory memory storing computer executable instructions that when executed by the at least one processor, perform a method for contextual automation within a group-based communication system, the method including causing display of a workflow button within a virtual space of the group-based communication system to a user of the group-based communication system, at least one display parameter of the workflow button being determined based on a context associated with the virtual space, receiving, from the user, an actuation of the workflow button, responsive to the actuation of the workflow button, receiving a plurality of contextual parameters associated with the workflow button including a user identifier associated with the user and contextual data associated with the virtual space, initiating an associated workflow associated with the workflow button to perform one or more automated operations based on the plurality of contextual parameters, receiving a response indicative of a completion of the associated workflow, and updating the workflow button within the virtual space of the group-based communication system based on the received response indicative of the completion of the associated workflow.

In some aspects, the techniques described herein relate to a system, the method further including responsive to performing an operation of the one or more automated operations, initiating an additional workflow to perform one or more additional operations, receiving a completion confirmation associated with the additional workflow, and performing a further operation of the one or more automated operations dependent on the completion confirmation associated with the additional workflow.

In some aspects, the techniques described herein relate to a system, the method further including responsive to performing an operation of the one or more automated operations, causing display of a new workflow button within the virtual space, wherein the new workflow button is configured to initiate an additional workflow.

In some aspects, the techniques described herein relate to a system, the method further including responsive to performing an operation of the one or more automated operations, creating a second virtual space based on the plurality of contextual parameters within the virtual space, wherein the second virtual space includes a direct message, a channel, a collaborative document, or a collaboration session.

In some aspects, the techniques described herein relate to a system, the method further including causing display of the workflow button within a second virtual space to a second user of the group-based communication system, the at least one display parameter of the workflow button in the second virtual space being different from the at least one display parameter in the virtual space, responsive to the actuation of the workflow button in the second virtual space, retrieving the plurality of contextual parameters associated with the actuation of the workflow button including a second user identifier associated with the second user and a second contextual identifier indicative of the second virtual space, determining a second workflow for the workflow button based on the workflow button and the plurality of contextual parameters, the second workflow being different from the associated workflow, and initiating the second workflow.

In some aspects, the techniques described herein relate to a system, the method further including responsive to performing an operation of the one or more automated operations, storing information indicative of a first one of the plurality of contextual parameters in a storage location determined based on a second one of the plurality of contextual parameters.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 2B illustrates a user interface for synchronous multimedia collaboration sessions within the group-based communication system for certain embodiments;

FIG. 7C illustrates an exemplary data table relating to some embodiments;

Figure 1:
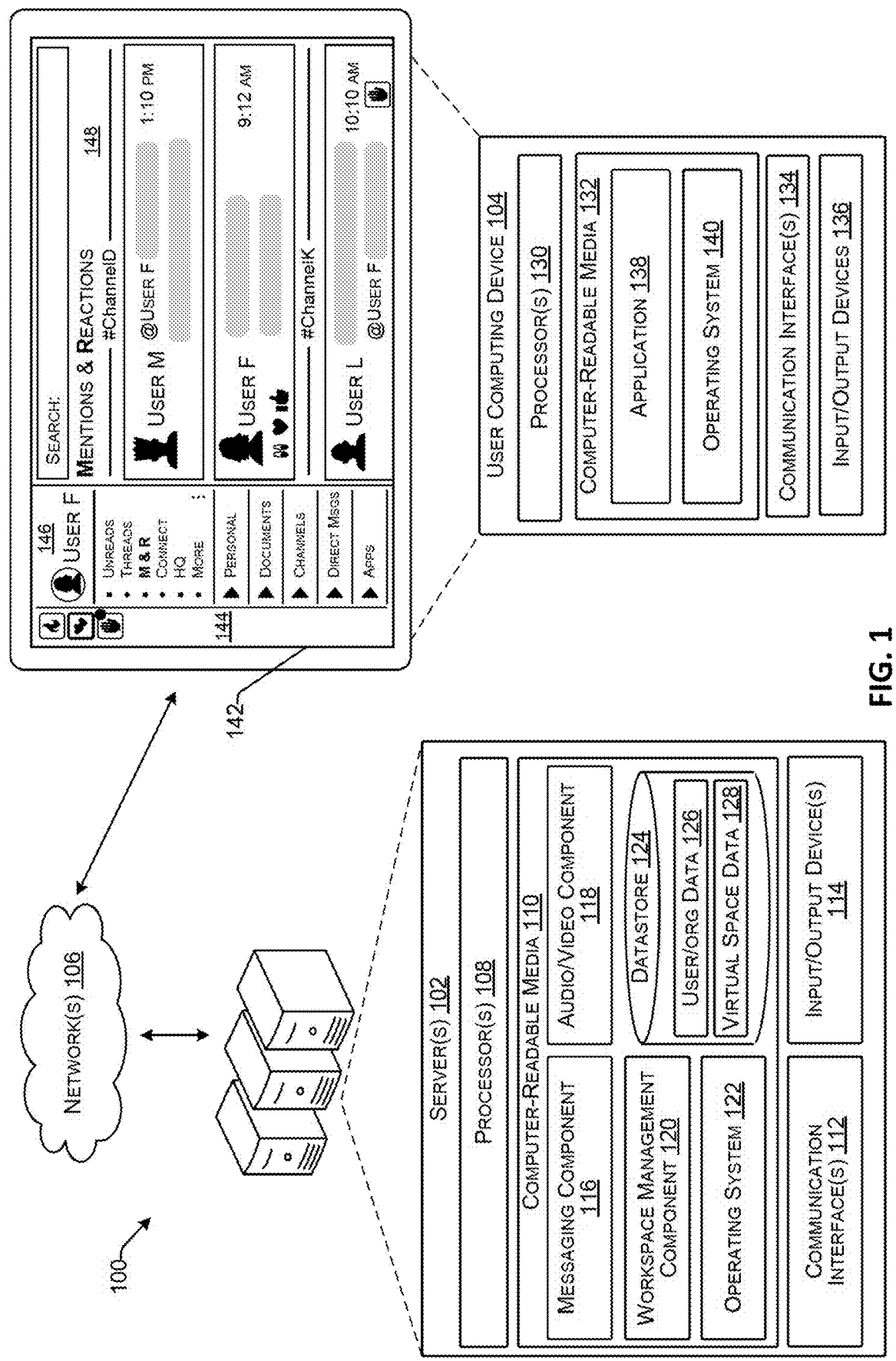
FIG. 1 depicts an exemplary environment for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Some embodiments of the invention relate to implementing contextual buttons within a group-based communication system such that the buttons, when actuated by a user or some other triggering event, initiate one or more automated workflows. The automated workflows may be configured to perform one or more automated operations either internally within the group-based communication system or externally within, for example, a third-party application. In some embodiments, various means for accessing and configuring the buttons from within the group-based communication system are contemplated. For example, in some embodiments, a buttons directory may be included for allowing users to curate a list of available buttons to be shared and posted within the group-based communication system. Further, in some embodiments, users may be able to manually configure various button parameters such as what workflow is initiated by a given button.

In some embodiments, the buttons are able to retrieve one or more contextual parameters associated with a context of the group-based communication system. These contextual parameters may be passed to the initiated workflow such that the automated operations may be performed contextually based at least in part on the one or more contextual parameters. In some such embodiments, the contextual parameters may include an indication of the user who selected the button, as well as an indication of the context of the button within the group-based communication system, such as, which channel, or other virtual space from which the button was actuated. Accordingly, the workflows may be executed based at least in part on the context from which the button was actuated. As such, at least a portion of the operations of a workflow may be executed differently based on which user selects the button and where the button is selected.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with the same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units and can include single or multiple computing units or multiple processing cores. The processor(s) 108 can be implemented as one or more microprocessors, microcomputers, microcontrollers, digital signal processors, central processing units (CPUs), graphics processing units (CPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116, an audio/video component 118, a workspace management component 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of the user interface associated with one or more of the users associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the workspace management component 120 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 120 can manage workspace membership. That is, the workspace management component 120 can receive requests to associate users with individual workspaces and the workspace management component 120 can associate user accounts associated with such users with group identifiers associated with the individual workspaces. For example, responsive to receiving a request to add a user to a workspace, the workspace management component 120 can associate a user account of the user with a group identifier of the workspace. The workspace management component 120 can disassociate user accounts and group identifiers, for example, when a user is removed from a workspace.

In at least one example, the workspace management component 120 can manage cross-workspace data integration, as described herein. For example, the workspace management component 120 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 120 can detect updates to data associated with a workspace and can integrate such updated data into user interface(s) presented via user computing device(s) of user(s) associated with the workspace. Similarly, the workspace management component 120 can facilitate cross-workspace operations. For example, the workspace management component 120 can facilitate messages between workspaces, searches between or across multiple workspaces, and the like. Additional details of operations that can be performed by the workspace management component 120 are described below.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), Hypertext Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform, or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142. Additional details associated with the second region 146 and indicator(s) are described below.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via Websockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the workspace management component 120, and the application 138, techniques described herein can be performed by any other component, or combination of components, which can be associated with the server(s) 102, the user computing device 104, or a combination thereof.

User Interface for a Group-Based Communication System

Figure 2A:
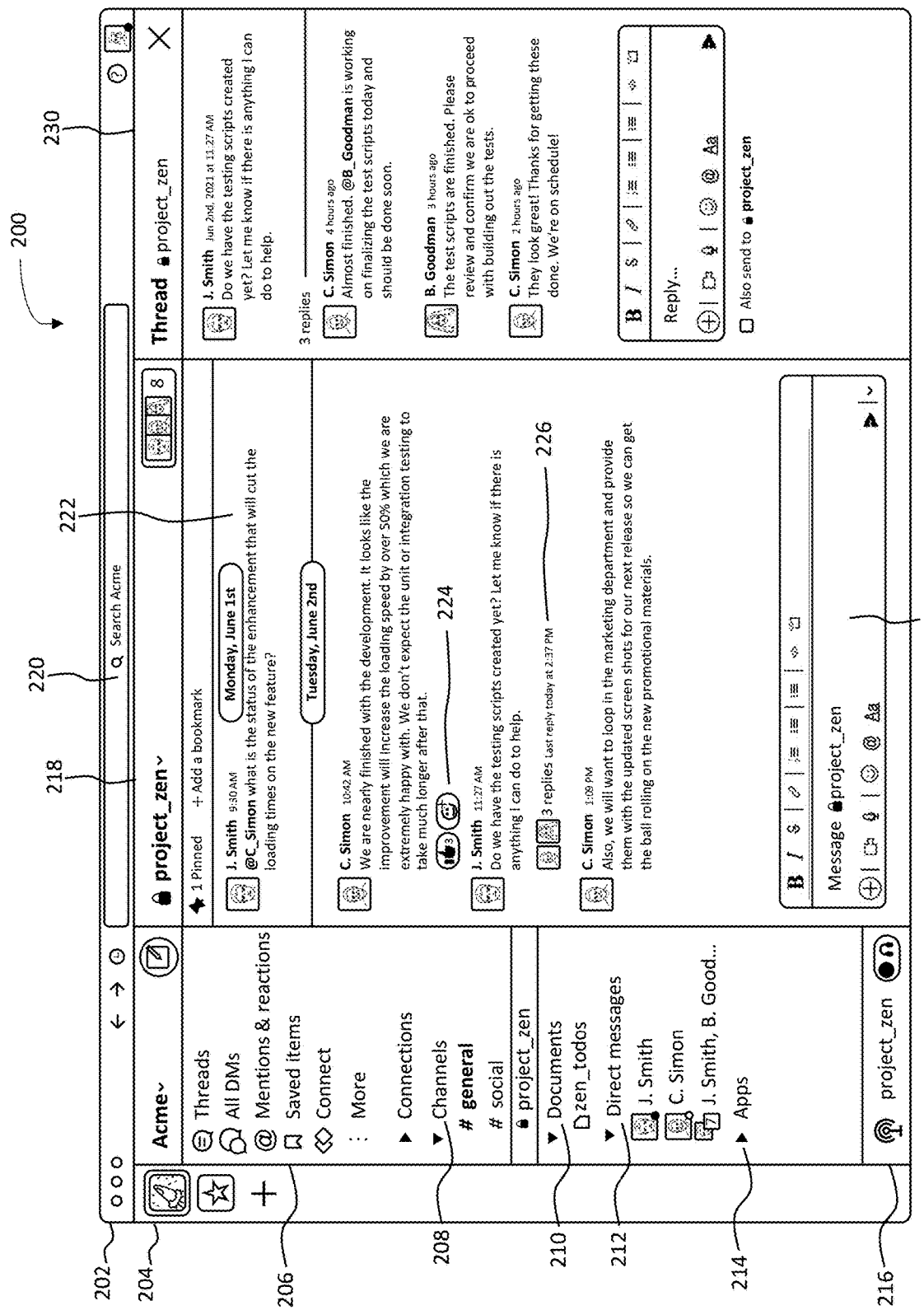
FIG. 2A illustrates a user interface for a group-based communication system for certain embodiments.

FIG. 2A illustrates a user interface 200 of a group-based communication system, which will be useful in illustrating the operation of various embodiments, as discussed in further detail below. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

User interface 200 comprises a plurality of objects such as panes, text entry fields, buttons, messages, or other user interface components that are viewable by a user of the group-based communication system. As depicted, user interface 200 comprises title bar 202, workspace pane 204, navigation pane 206, synchronous multimedia collaboration session pane 216, channel pane 218, and thread pane 230.

In some embodiments, title bar 202 comprises search bar 220. Search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some embodiments, title bar 202 comprises navigation commands allowing a user to move backwards and forwards between different panes, as well as to view a history of accessed content. Title bar 202 may comprise additional resources such as links to help documents and user configuration settings.

In some embodiments, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some embodiments, user interface 200 comprises workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some embodiments, an organization, such as a particular company, may have a plurality of workspaces, and the user may be associated with one or more workspaces belonging to the organization. In yet other embodiments, a particular workspace can be associated with one or more organizations or other entities associated with the group-based communication system.

In some embodiments, navigation pane 206 permits users to navigate between virtual spaces such as pages, channels 208, collaborative documents 210 (such as those discussed at FIG. 2D), applications 214, and direct messages 212 within the group-based communication system. For example, navigation pane 206 can include indicators representing virtual spaces that can aggregate data associated with a plurality of virtual spaces of which the user is a member. In at least one example, each virtual space can be associated with an indicator in navigation pane 206. In some examples, an indicator can be associated with an actuation mechanism (e.g., affordance) such that when actuated, can cause user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

Though not illustrated, in some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally, though not illustrated, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

Navigation pane 206 may further comprise indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces or, alternatively, may only be associated with one of the workspaces. In some examples, the communication channels represented can be associated with combinations of communication channels associated with a single workspace and communication channels associated with different workspaces.

In some embodiments, navigation pane 206 may depict all communication channels, or a subset of all communication channels, that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, navigation pane 206 can depict all communication channels, or a subset of all communication channels, that the user is a member of, and the user can interact with user interface 200 to browse or view other communication channels that the user is not a member of but are not currently displayed in navigation pane 206. In some examples, different types of communication channels (e.g., public, private, shared, cross-workspace, etc.) can be in different sections of navigation pane 206, or can have their own sub-regions or sub-panes in the user interface 200. In some examples, communication channels associated with different workspaces can be in different sections of navigation pane 206 or can have their own regions or panes in user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, navigation pane 206 can include indicators representative of communications with individual users or multiple specified users (e.g., instead of all, or a subset of, members of an organization). Such communications can be referred to as "direct messages." Navigation pane 206 can include indicators representative of virtual spaces that are associated with private messages between one or more users.

Direct messages 212 may be communications between a first user and a second user, or they may be multi-person direct messages between a first user and two or more second users. Navigation pane 206 may be sorted and organized into hierarchies or sections depending on the user's preferences. In some embodiments, all of the channels to which a user has been granted access may appear in navigation pane 206. In other embodiments, the user may choose to hide certain channels or collapse sections containing certain channels.

Items in navigation pane 206 may indicate when a new message or update has been received or is currently unread, such as by bolding the text associated with a channel in which an unread message is located or adding an icon or badge (for example, with a count of unread messages) to the channel name. In some embodiments, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally, though not illustrated, navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels Within the Group-Based Communication System

In some embodiments, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some embodiments, channel pane 218 may display information related to a channel that a user has selected in navigation pane 206. For example, a user may select the project_zen channel to discuss the ongoing software development efforts for Project Zen. In some embodiments, channel pane 218 may include a header comprising information about the channel, such as the channel name, the list of users in the channel, and other channel controls. Users may be able to pin items to the header for later access and to add bookmarks to the header. In some embodiments, links to collaborative documents may be included in the header. In further embodiments, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via channel pane 218 of user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

Channel pane 218 may include messages such as message 222, which is content posted by a user into the channel. Users may post text, images, videos, audio, or any other file as message 222. In some embodiments, particular identifiers (in messages or otherwise) may be denoted by prefixing them with predetermined characters. For example, channels may be prefixed by the "#" character (as in #project_zen) and username may be prefixed by the "@" character (as in @austin_a). Messages such as message 222 may include an indication of which user posted the message and the time at which the message was posted. In some embodiments, users may react to messages such as message 222 by selecting reaction button 224. Reaction button 224 allows users to select an icon (sometimes called a reactji in this context), such as a thumbs up, to be associated with the message. Users may respond to messages such as message 222 of another user with a new message such as message 222. In some embodiments, such conversations in channels may further be broken out into threads. Threads may be used to aggregate messages related to a particular conversation together to make the conversation easier to follow and reply to, without cluttering the main channel with the discussion. Under the message beginning the thread appears thread reply preview 226. Thread reply preview 226 may show information related to the thread, such as, for example, the number of replies and the members who have replied. Thread replies may appear in thread pane 230 that may be separate from channel pane 218 and may be viewed by other members of the channel by selecting thread reply preview 226 in channel pane 218.

In some embodiments, one or both of channel pane 218 and thread pane 230 may include compose pane 228. Compose pane 228 allows users to compose and transmit messages 222 to the members of the channel or to those members of the channel who are following the thread (when the message is sent in a thread). Compose pane 228 may have text editing functions such as bold, strikethrough, and italicize. Compose pane 228 may also allow users to format their messages or attach files such as collaborative documents, images, videos, or any other files to share with other members of the channel. In some embodiments, compose pane 228 may enable additional formatting options such as numbered or bulleted lists via either the user interface or an API. Compose pane 228 may also function as a workflow trigger to initiate workflows related to a channel or message. In further embodiments, links or documents sent via compose pane 228 may include unfurl instructions related to how the content should be displayed.

Synchronous Multimedia Collaboration Sessions

Figure 2B:
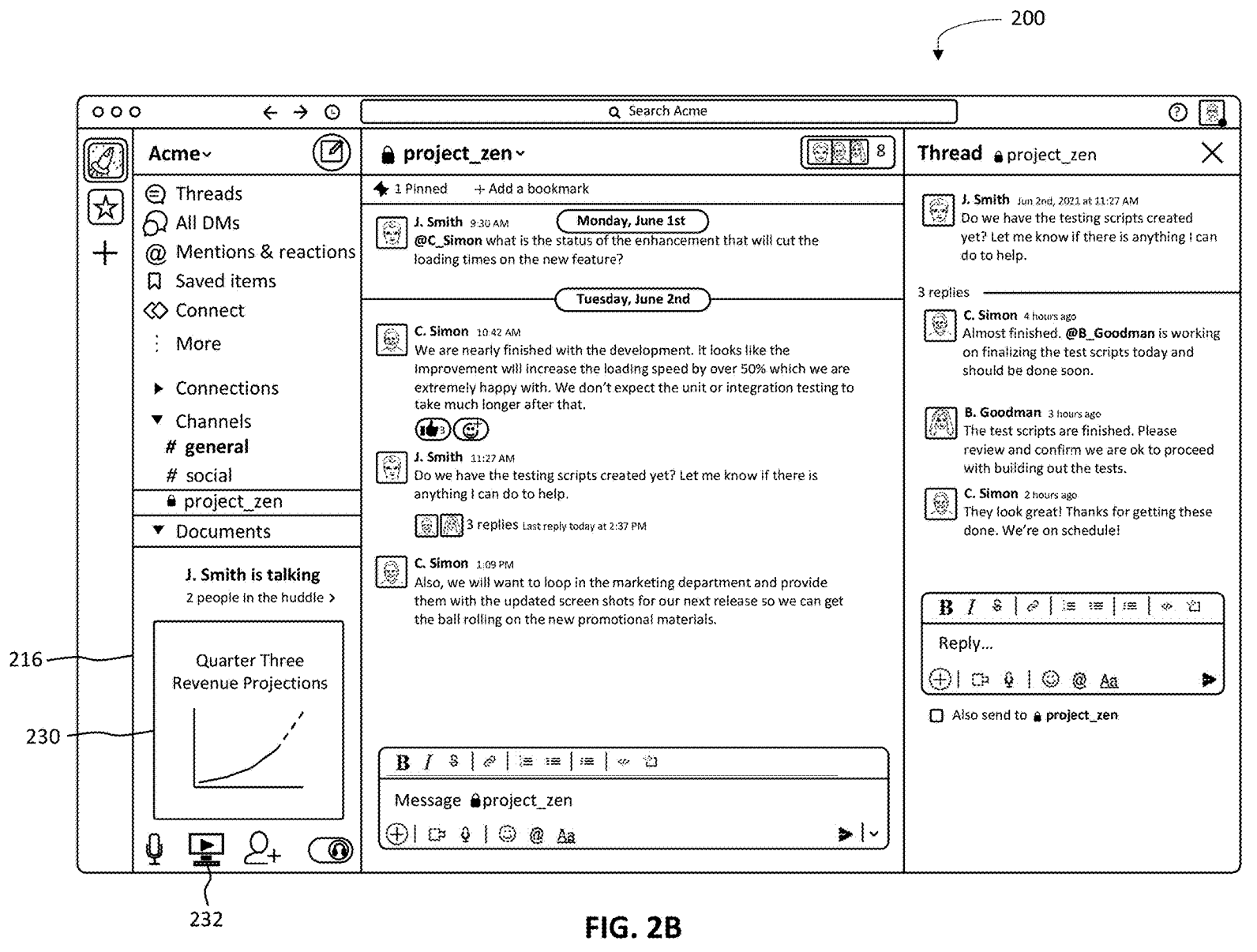

FIG. 2B illustrates a synchronous multimedia collaboration session that has been triggered from a channel, as shown in pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some embodiments, synchronous multimedia collaboration sessions may be based around a particular topic, a particular channel, a particular direct message or multi-person direct message, or a set of users, while in other embodiments, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some embodiments, the audience of a synchronous multimedia collaboration session may be determined based on the context in which the synchronous multimedia collaboration session was initiated. For example, starting a synchronous multimedia collaboration session in a channel may automatically invite the entire channel to attend. As another example. Starting a synchronous multimedia collaboration session allows the user to start an immediate audio and/or video conversation with other members of the channel without requiring scheduling or initiating a communication session through a third-party interface. In some embodiments, users may be directly invited to attend a synchronous multimedia collaboration session via a message or notification.

Synchronous multimedia collaboration sessions may be short, ephemeral sessions from which no data is persisted. Alternatively, in some embodiments, synchronous multimedia collaboration sessions may be recorded, transcribed, and/or summarized for later review. In other embodiments, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some embodiments, members of the synchronous multimedia collaboration session may mark-up, comment on, draw on, or otherwise annotate a shared screen. In further embodiments, such annotations may be saved and persisted after the synchronous multimedia collaboration session has ended. A canvas may be created directly from a synchronous multimedia collaboration session to further enhance the collaboration between users.

In some embodiments, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 231. In some embodiments, users in the synchronous multimedia collaboration session may be displayed with an icon indicating that they are participating in the synchronous multimedia collaboration session. In further embodiments, an expanded view of the participants may show which users are active in the synchronous multimedia collaboration session and which are not. Screen share preview 231 may depict the desktop view of a user sharing the user's screen, or a particular application or presentation. Changes to the user's screen, such as the user advancing to the next slide in a presentation, will automatically be depicted in screen share preview 231. In some embodiments, screen share preview 231 may be actuated to cause screen share preview 231 to be enlarged such that it is displayed as its own pane within the group-based communication system. Synchronous multimedia collaboration session pane 216 may comprise tools for the synchronous multimedia collaboration session allowing a user to mute the user's microphone or invite other users. In some embodiments, synchronous multimedia collaboration session pane 216 may comprise screen share button 232. Screen share button 232 may permit a user to share the user's screen with other members of the synchronous multimedia collaboration session pane 216. In some embodiments, screen share button 232 may provide a user with additional controls during a screen share. For example, a user sharing the user's screen may be provided with additional screen share controls to specify which screen to share, to annotate the shared screen, or to save the shared screen. When no synchronous multimedia collaboration session is active, synchronous multimedia collaboration session pane 216 may be associated with a currently selected channel, direct message, or multi-person direct message such that a synchronous multimedia collaboration session may be initiated and associated with the currently selected channel, direct message, or multi-person direct message. Similarly, when a synchronous multimedia collaboration session is active, the synchronous multimedia collaboration session pane 216 may be associated with a channel in which the synchronous multimedia collaboration session was initiated. In some embodiments, synchronous multimedia collaboration session pane 216 may instead be unassociated with any channels, multi-person direct messages, or direct messages.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some embodiments, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some embodiments, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some embodiments, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some embodiments, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some embodiments, one or more recommended asynchronous multimedia collaboration sessions or meetings are displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some embodiments, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some embodiments, a preview of a subset of video replies may be shown in the asynchronous collaboration session or thread. This can allow, for example, a user to jump to a relevant segment of the asynchronous multimedia collaboration session or to pick up where they left off previously.

In some embodiments, the group-based communication system may comprise one or more canvases (or one or more links to canvases). A canvas can include a flexible workspace for curating, organizing, and sharing collections of information between users. Such canvases may be associated with a synchronous multimedia collaboration session, an asynchronous multimedia collaboration session, a channel, a multi-person direct message conversation, or a direct message conversation. Alternatively, or in addition, a user might have one or more private canvases that are not associated with any other users. Shared canvases can be configured to be accessed and/or modified by two or more users with appropriate permissions. In some embodiments, canvases can be configured to enable sharing of content including (but not limited to) text, images, videos, GIFs, drawings (e.g., user-generated drawings via a drawing interface), or gaming content. In some embodiments, users accessing a canvas can add new content or delete (or modify) content previously added. In some embodiments, appropriate permissions may be required for a user to add content or to delete or modify content added by a different user. Thus, for example, some users may only be able to access a canvas in view-only mode, while other users may be able to access the canvas in an edit mode allowing those users to add or modify its contents. In some examples, a canvas can be shared via a message in a channel, multi-person direct message, or direct message, such that data associated with the canvas is accessible to and/or rendered interactable for members of the channel or recipients of the multi-person direct message or direct message.

Connecting Within the Group-Based Communication System

Figure 2C:
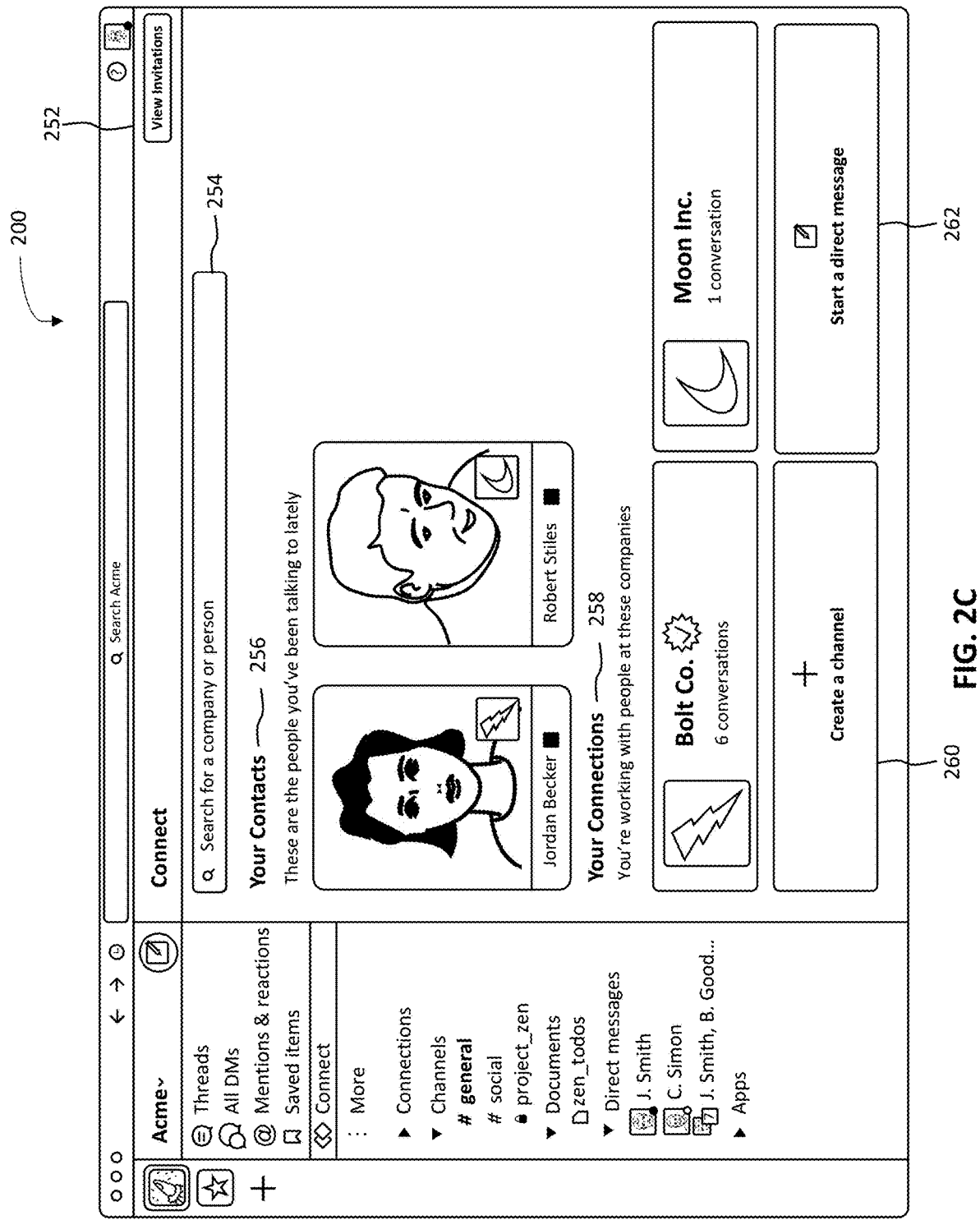
FIG. 2C illustrates a user interface for inter-organization collaboration within the group-based communication system for certain embodiments.

FIG. 2C illustrates user interface 200 displaying connect pane 252. Connect pane 252 provides tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. Connect pane 252 may enable users to determine which other users and organizations are already within the group-based communication system, and to invite those users and organizations currently outside of the group-based communication system to join.

Connect pane 252 may comprise connect search bar 254, recent contacts 256, connections 258, create channel button 260, and start direct message button 262. Connect search bar 254 permits a user to search for users within the group-based communication system. In some embodiments, only users from organizations that have connected with the user's organization will be shown in the search results. In other embodiments, users from any organization that uses the group-based communication system can be displayed. In still other embodiments, users from organizations that do not yet use the group-based communication can also be displayed, allowing the searching user to invite them to join the group-based communication system. In some embodiments, users can be searched for via their group-based communication system username or their email address. In some embodiments, email addresses may be suggested or auto-completed based on external sources of data such as email directories or the searching user's contact list.

In some embodiments, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some embodiments, recent contacts 256 may display users with whom the instant user has recently interacted. The recent contacts 256 may display the user's name, company, and a status indication. Recent contacts 256 may be ordered based on which contacts the instant user most frequently interacts with or based on the contacts with whom the instant user most recently interacted. In some embodiments each recent contact of recent contacts 256 may be an actuatable control allowing the instant user to quickly start a direct message conversation with the recent contact, invite them to a channel, or take any other appropriate user action for that recent contact.

In some embodiments, connections 258 may display a list of companies (e.g., organizations) with which the user has interacted. For each company, the name of the company may be displayed along with the company's logo and an indication of how many interactions the user has had with the company, for example the number of conversations. In some embodiments, each connection of connections 258 may be an actuatable control allowing the instant user to quickly invite the external organization to a shared channel, display recent connections with that external organization, or take any other appropriate organization action for that connection.

In some embodiments, create channel button 260 allows a user to create a new shared channel between two different organizations. Selecting create channel button 260 may further allow a user to name the new connect channel and enter a description for the connect channel. In some embodiments, the user may select one or more external organizations or one or more external users to add to the shared channel. In other embodiments, the user may add external organizations or external users to the shared channel after the shared channel is created. In some embodiments, the user may elect whether to make the connect channel private (i.e., accessible only by invitation from a current member of the private channel).

In some embodiments, start direct message button 262 allows a user to quickly start a direct message (or multi-person direct message) with external users at an external organization. In some embodiments, the external user identifier at an external organization may be supplied by the instant user as the external user's group-based communication system username or as the external user's email address. In some embodiments, an analysis of the email domain of the external user's email address may affect the message between the user and the external user. For example, the external user's identifier may indicate (for example, based on an email address domain) that the user's organization and the external user's organization are already connected. In some such embodiments, the email address may be converted to a group-based communication system username. Alternatively, the external user's identifier may indicate that the external user's organization belongs to the group-based communication system but is not connected to the instant user's organization. In some such embodiments, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
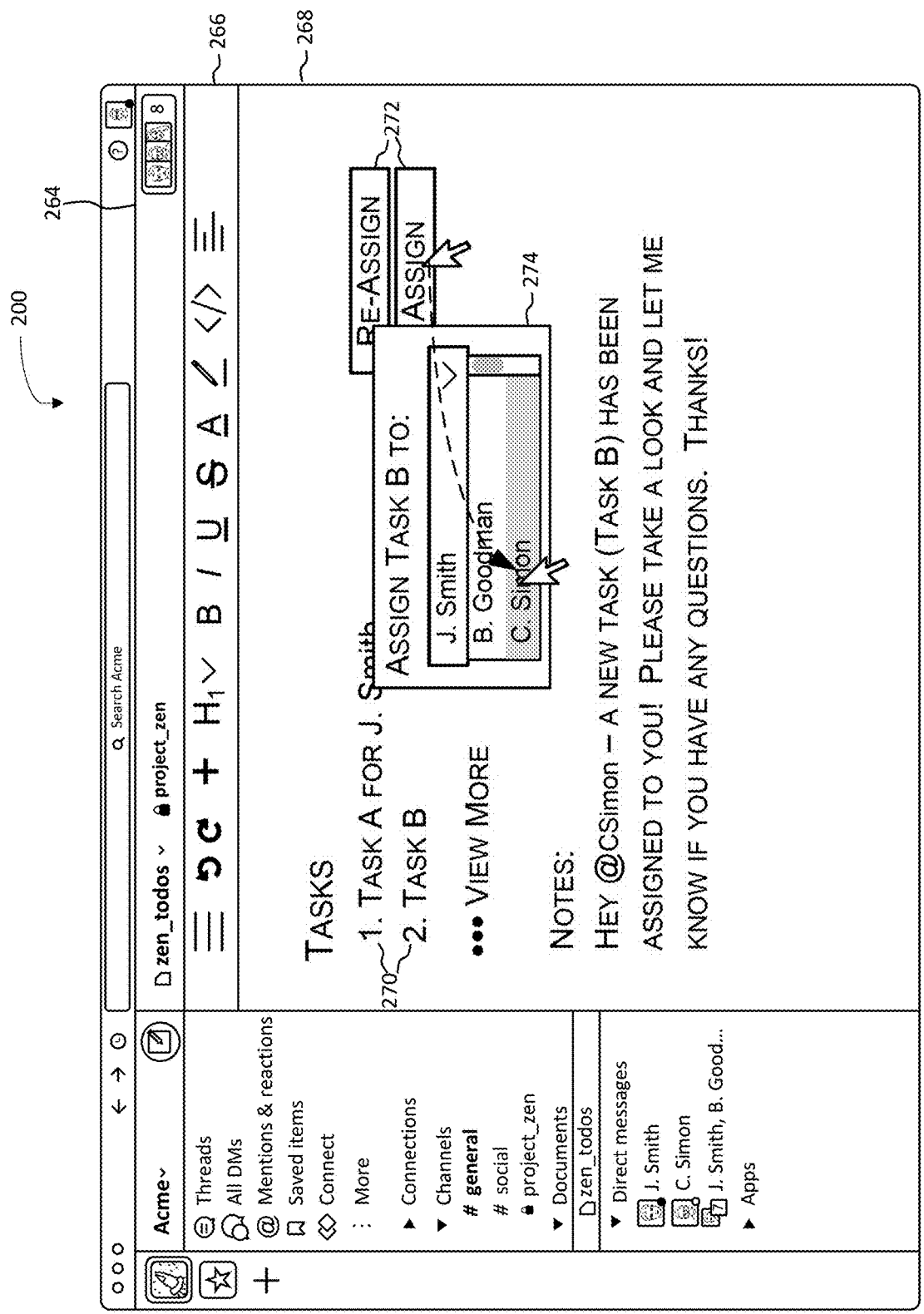
FIG. 2D illustrates a user interface for collaborative documents within the group-based communication system for certain embodiments.

FIG. 2D illustrates user interface 200 displaying collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. Collaborative documents may allow users to simultaneously or asynchronously create and modify documents. Collaborative documents may integrate with the group-based communication system and can both initiate workflows and be used to store the results of workflows, which are discussed further below with respect to FIGS. 3A and 3B. Collaboration document pane 264 may comprise collaborative document toolbar 266 and collaborative document 268. In some embodiments, collaborative document toolbar 266 may provide the ability to bold, italicize, underline, or otherwise format text, the ability to undo or redo actions, the ability to insert and format pictures and shapes, or any other word processing functionality to modify the content within collaborative document 268.

In some embodiments, collaborative documents may comprise free-form unstructured sections and workflow-related structured sections. In some embodiments, unstructured sections may include areas of the document in which a user can freely modify the collaborative document without any constraints. For example, a user may be able to freely type text to explain the purpose of the document. In some embodiments, a user may add a workflow or a structured workflow section by typing the name of (or otherwise mentioning) the workflow. In further embodiments, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some embodiments, structured sections may include text entry, selection menus, tables, checkboxes, tasks, calendar events, or any other document section. In further embodiments, structured sections may include text entry spaces that are a part of a workflow. For example, a user may enter text into a text entry space detailing a reason for approval, and then select a submit button that will advance the workflow to the next step of the workflow. In some embodiments, the user may be able to add, edit, or remove structured sections of the document that make up the workflow components.

In embodiments, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further embodiments, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In embodiments, the first user can select the plurality of collaborative documents and the "Group Information" section to effectuate permissions to access (or view, edit, etc.) to the entire user group the "Group Information" section of each of the plurality of collaborative documents. In some embodiments, the collaborative document comprises one or more tasks 270 along with one or more corresponding assignment options 272, as shown. In some embodiments, an assignment dropdown menu 274 may be displayed in response to a user selecting one of the one or more assignment options 272.

Automation in the Group-Based Communication System

Figure 3A:
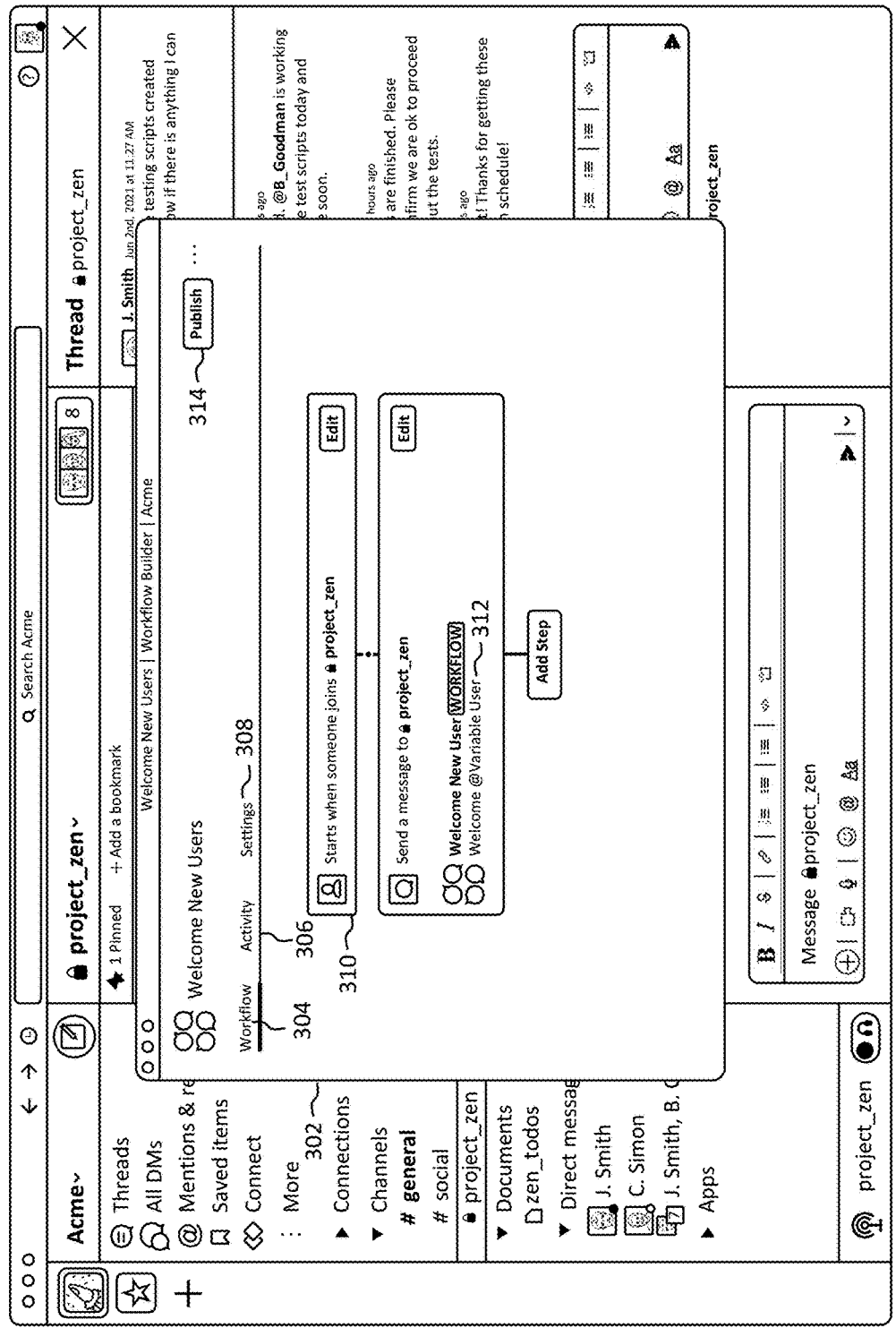
FIG. 3A depicts a user interface for workflows within a group-based communication system.

FIG. 3A illustrates user interface 300 for automation in the group-based communication system. Automation, also referred to as workflows, allow users to automate functionality within the group-based communication system. Workflow builder 302 is depicted which allows a user to create new workflows, modify existing workflows, and review the workflow activity. Workflow builder 302 may comprise workflow tab 304, activity tab 306, and settings tab 308. In some embodiments, workflow builder may include publish button 314 which permits a user to publish a new or modified workflow.

Workflow tab 304 may be selected to enable a user to create a new workflow or to modify an existing workflow. For example, a user may wish to create a workflow to automatically welcome new users who join a channel. A workflow may comprise workflow steps 310. Workflow steps 310 comprise at least one trigger which initiates the workflow and at least one function which takes an action once the workflow is triggered. For example, a workflow may be triggered when a user joins a channel, and a function of the workflow may be to post within the channel welcoming the new user. In some embodiments, workflows may be triggered from a user action, such as a user reacting to a message, joining a channel, or collaborating in a collaborative document, from a scheduled date and time, or from a web request from a third-party application or service. In further embodiments, workflow functionality may include sending messages or forms to users, channels, or any other virtual space, modifying collaborative documents, or interfacing with applications. Workflow functionality may include workflow variables 312. For example, a welcome message may include a user's name via a variable to allow for a customized message. Users may edit existing workflow steps or add new workflow steps depending on the desired workflow functionality. Once a workflow is complete, a user may publish the workflow using publish button 314. A published workflow will wait until it is triggered, at which point the functions will be executed.

Activity tab 306 may display information related to a workflow's activity. In some embodiments, activity tab 306 may show how many times a workflow has been executed. In further embodiments, activity tab 306 may include information related to each workflow execution including the status, last activity date, time of execution, user who initiated the workflow, and other relevant information. Activity tab 306 may permit a user to sort and filter the workflow activity to find useful information.

Settings tab 308 may permit a user to modify the settings of a workflow. In some embodiments, a user may change a title or an icon associated with the workflow. Users may also manage the collaborators associated with a workflow. For example, a user may add additional users to a workflow as collaborators such that the additional users can modify the workflow. In some embodiments, settings tab 308 may also permit a user to delete a workflow.

Figure 3B:
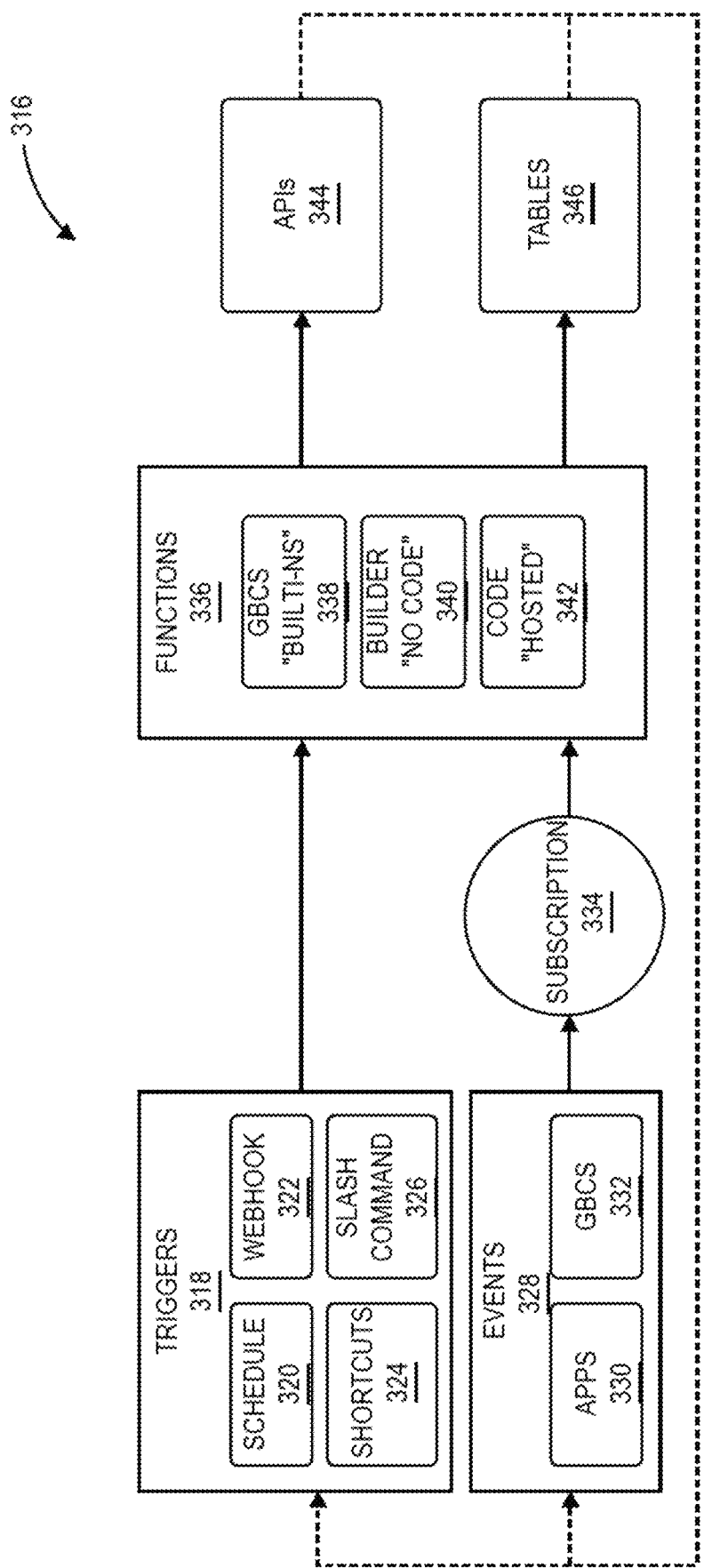
FIG. 3B depicts a block diagram for carrying out certain embodiments.

FIG. 3B depicts elements related to workflows in the group-based communication system and is referred to generally by reference numeral 316. In various embodiments, triggers 318 are configured to invoke execution of function 336 responsive to user instructions. A trigger initiates function execution and may take the form of a schedule 320, a webhook 322, a shortcut 324, or a slash command 326. In some embodiments, schedule 320 operates like a timer so that a trigger may be scheduled to fire periodically or once at a predetermined point in the future. In some embodiments, an end user of an event-based application sets an arbitrary schedule for the firing of a trigger, such as once-an-hour or every day at 9:15 AM.

Additionally, triggers 318 may take the form of webhook 322. Webhook 322 is a software component that listens at a webhook URL and port. In some embodiments, a trigger fires when an appropriate HTTP request is received at the webhook URL and port. In some embodiments, webhook 322 requires proper authentication such as by way of a bearer token. In other embodiments, triggering will be dependent on payload content.

Another source of one of triggers 318 is a shortcut in shortcuts 324. In some embodiments, shortcuts 324 are global to a group-based communication system and are not specific to a group-based communication system channel or workspace. Global shortcuts may trigger functions that are able to execute without the context of a particular group-based communication system message or group-based communication channel. By contrast, message- or channel-based shortcuts are specific to a group-based communication system message or channel and operate in the context of the group-based communication system message or group-based communication channel.

A further source of one of triggers 318 may be provided by way of slash commands 326. Slash commands 326 may serve as entry points for group-based communication system functions, integrations with external services, or group-based communication system message responses. In some embodiments, slash commands 326 may be entered by a user of a group-based communication system to trigger execution of application functionality. Slash commands may be followed by slash-command-line parameters that may be passed along to any group-based communication system function that is invoked in connection with the triggering of a group-based communication system function such as one of functions 336.

An additional way in which a function is invoked is when an event (such as one of events 328) matches one or more conditions as predetermined in a subscription (such as subscription 334). Events 328 may be subscribed to by any number of subscriptions 334, and each subscription may specify different conditions and trigger a different function. In some embodiments, events are implemented as group-based communication system messages that are received in one or more group-based communication system channels. For example, all events may be posted as non-user visible messages in an associated channel, which is monitored by subscriptions 334. App events 330 may be group-based communication system messages with associated metadata that are created by an application in a group-based communication system channel. Events 328 may also be direct messages received by one or more group-based communication system users, which may be an actual user or a technical user, such as a bot. A bot is a technical user of a group-based communication system that is used to automate tasks. A bot may be controlled programmatically to perform various functions. A bot may monitor and help process group-based communication system channel activity as well as post messages in group-based communication system channels and react to members' in-channel activity. Bots may be able to post messages and upload files as well as be invited or removed from both public and private channels in a group-based communication system.

Events 328 may also be any event associated with a group-based communication system. Such group-based communication system events 332 include events relating to the creation, modification, or deletion of a user account in a group-based communication system or events relating to messages in a group-based communication system channel, such as creating a message, editing, or deleting a message, or reacting to a message. Events 328 may also relate to creation, modification, or deletion of a group-based communication system channel or the membership of a channel. Events 328 may also relate to user profile modification or group creation, member maintenance, or group deletion.

As described above, subscription 334 indicates one or more conditions that, when matched by events, trigger a function. In some embodiments, a set of event subscriptions is maintained in connection with a group-based communication system such that when an event occurs, information regarding the event is matched against a set of subscriptions to determine which (if any) of functions 336 should be invoked. In some embodiments, the events to which a particular application may subscribe are governed by an authorization framework. In one embodiment, the event types matched against subscriptions are governed by OAuth permission scopes that may be maintained by an administrator of a particular group-based communication system.

Functions 336 are triggered by triggers 318 and events 328 to which the function is subscribed. Functions 336 take zero or more inputs, perform processing (potentially including accessing external resources), and return zero or more results. Functions 336 may be implemented in various forms. First, there are group-based communication system built-ins 338, which are associated with the core functionality of a particular group-based communication system. Some examples include creating a group-based communication system user or channel. Second are no-code builder functions 340 that may be developed by a user of a group-based communication system user in connection with an automation user interface such as workflow builder user interface. Third, there are hosted-code functions 342 that are implemented by way of group-based communication system applications developed as software code in connection with a software development environment.

These various types of functions 336 may in turn integrate with APIs 344. In some embodiments, APIs 344 are associated with third-party services that functions 336 employ to provide a custom integration between a particular third-party service and a group-based communication system. Examples of third-party service integrations include video conferencing, sales, marketing, customer service, project management, and engineering application integration. In such an example, one of the triggers 318 would be a slash command 326 that is used to trigger a hosted-code function 342, which makes an API call to a third-party video conferencing provider by way of one of the APIs 344. As shown in FIG. 3B, the APIs 344 may themselves also become a source of any number of triggers 318 or events 328. Continuing the above example, successful completion of a video conference would trigger one of the functions 336 that sends a message initiating a further API call to the third-party video conference provider to download and archive a recording of the video conference and store it in a group-based communication system channel.

In addition to integrating with APIs 344, functions 336 may persist and access data in tables 346. In some embodiments, tables 346 are implemented in connection with a database environment associated with a serverless execution environment in which a particular event-based application is executing. In one embodiment, tables 346 may be provided in connection with a relational database environment. In other embodiments, tables 346 are provided in connection with a database mechanism that does not employ relational database techniques. As shown in FIG. 3B, in some embodiments, reading or writing certain data to one or more of tables 346, or data in table matching predefined conditions, is itself a source of some number of triggers 318 or events 328. For example, if tables 346 are used to maintain ticketing data in an incident-management system, then a count of open tickets exceeding a predetermined threshold may trigger a message being posted in an incident-management channel in the group-based communication system.

Figure 3C:
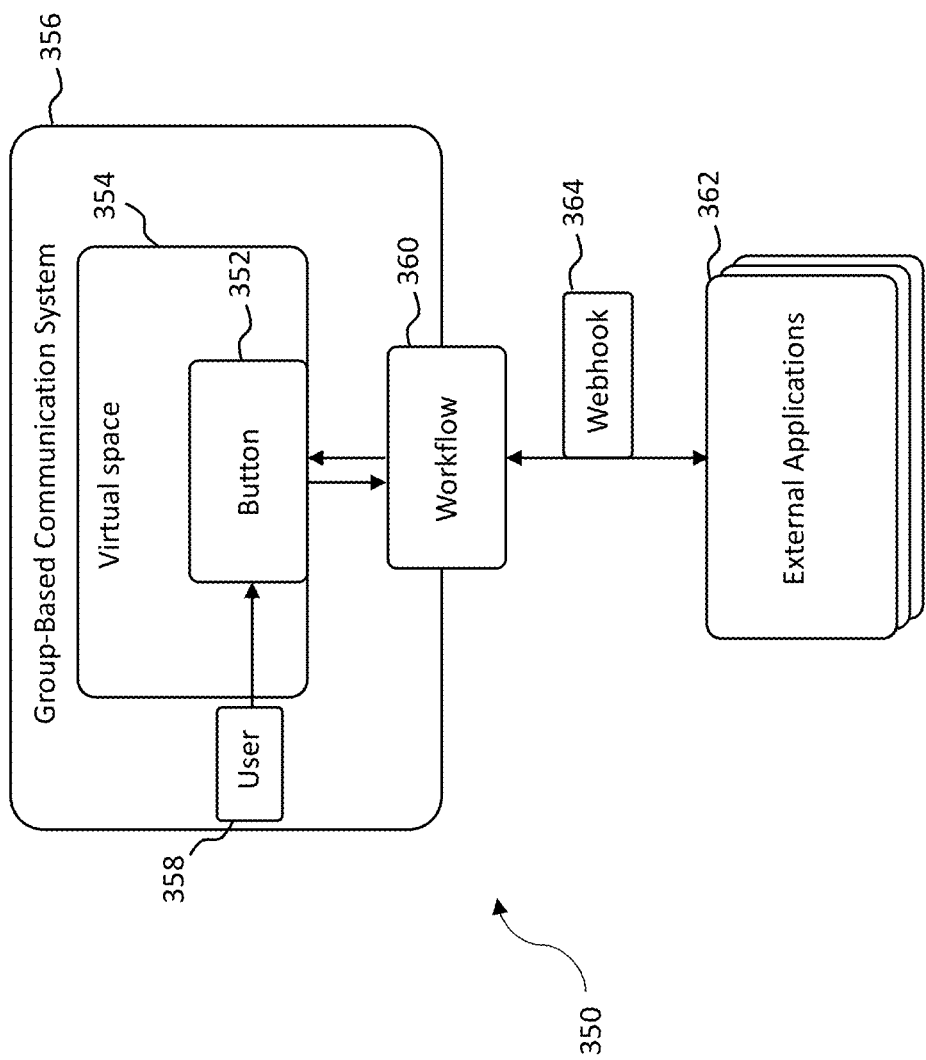
FIG. 3C depicts a block diagram for carrying out certain embodiments.

FIG. 3C illustrates an exemplary block diagram 350 relating to some embodiments of the invention. In some embodiments, the block diagram 350 comprises a button 352, as shown. In some embodiments, the button 352 includes a visual representation displayed within a user interface, such as within a virtual space 354 of the group-based communication system 356, as shown. In some embodiments, the button 352 may be actuated by a user 358 of the group-based communication system. For example, in some embodiments, the button 352 may be displayed in a context of the group-based communication system 356 such as within the virtual space 354 such that the user 358 may select the button 352 from a user interface. In some embodiments, the virtual space 354 comprises a channel, a direct message channel, a collaborative document environment, a synchronous multimedia collaboration session, or any other suitable context of the group-based communication system. It should be understood that, in some embodiments, the button 352 may comprise one or more actuatable options. For example, in some embodiments, the button 352 includes a plurality of selectable options such that the user 358 may actuate the button 352 by selecting any one of the options. Accordingly, the button 352 may initiate different operations based on which specific option is selected, as will be described in further detail below. Alternatively, in some embodiments, buttons may be included with a single selectable option.

In some embodiments, the button 352, when actuated, initiates a workflow 360. In some such embodiments, the workflow 360 may be initiated and executed from within the group-based communication system 356. Further, embodiments are contemplated in which the workflow 360 is initiated within the group-based communication system 356 but is at least partially executed within one or more external applications 362. In some embodiments, the workflow 360 may be associated with a webhook 364. For example, the webhook 364 may be used to provide communication between the group-based communication system 356 and the one or more external applications 362. In some embodiments, one or more operations of the workflow 360 may be carried out by submitting HTTP requests via the webhook 364. Further still, embodiments are contemplated in which the workflow 360 may be initiated externally. For example, actuation of the button 352 may cause an HTTP request to be transmitted that initiates the workflow 360 within the one or more external applications 362. In some embodiments, the workflow 360 may provide one or more return values to the button 352. For example, the workflow 360 may transmit a confirmation response back to the button 352 confirming that the workflow 360 was successfully completed. Alternatively, or additionally, in some embodiments, the return values transmitted from the workflow 360 may include any of a confirmation response, an error indication, or any of a variety of additional information, such as, for example, information retrieved from the one or more external applications 362. In some embodiments, the button 352 may be updated based at least in part on these return values. In some embodiments, a state of the button 352 or the virtual space 354 may be changed based on the execution of the workflow 360 or the webhook 364. For example, the button 352 may be visually and/or functionally altered based on the execution of the workflow 360, as will be described in further detail below.

It should be understood that, in some embodiments, the button 352 may initiate a plurality of workflows and functions. For example, in some embodiments, a button may be configured to initiate a first workflow that calls a second workflow after completion. Alternatively, embodiments are contemplated in which actuation of a button initiates two or more workflows simultaneously. As such, embodiments are contemplated in which buttons may be used to activate any number of workflows either simultaneously or consecutively. In some embodiments, the button 352, as described herein, may comprise any of graphical elements, images, pictures, icons, text, videos, additional selectable items, and the like. Further, in some embodiments, the actions described herein with respect to button 352 may be performed with a separate interface object that is not included within a button such as any of graphical elements, images, pictures, icons, text, videos, and selectable items, as well as other interface objects.

In some embodiments, the button-based initiation of the workflow 360 allows one or more contextual variables to be considered when initiating and/or executing the workflow 360. For example, in some embodiments, the button 352, when actuated, passes one or more contextual parameters to the workflow 360 such that at least one operation of the workflow 360 may be executed contextually based on a context of the button 352. In some embodiments, the contextual parameters include an indication of the virtual space 354, such as, for example, a channel identifier, a collaborative document identifier, or a session identifier, as well as an indication of one or more users, such as, for example, a user identifier of the user 358 who actuated the button 352 or, in some cases, a user identifier of the user who created or posted the button 352 within the virtual space 354. Accordingly, the workflow 360 may inherit the context of the button 352 and be executed contextually based on this context. In some embodiments, one or more operations of the workflow 360 may be performed differently based on the context received from the button 352. Accordingly, initiating workflows using buttons may provide a plurality of benefits such as performing workflows contextually by considering the contextual parameters of the group-based communication system. However, it should be understood that the button-based initiation of the workflow 360 is just one example and that the workflow 360 may be initiated by any of a variety of other triggers, as described above with respect to FIG. 3B.

Buttons in Channels

Figure 4A:
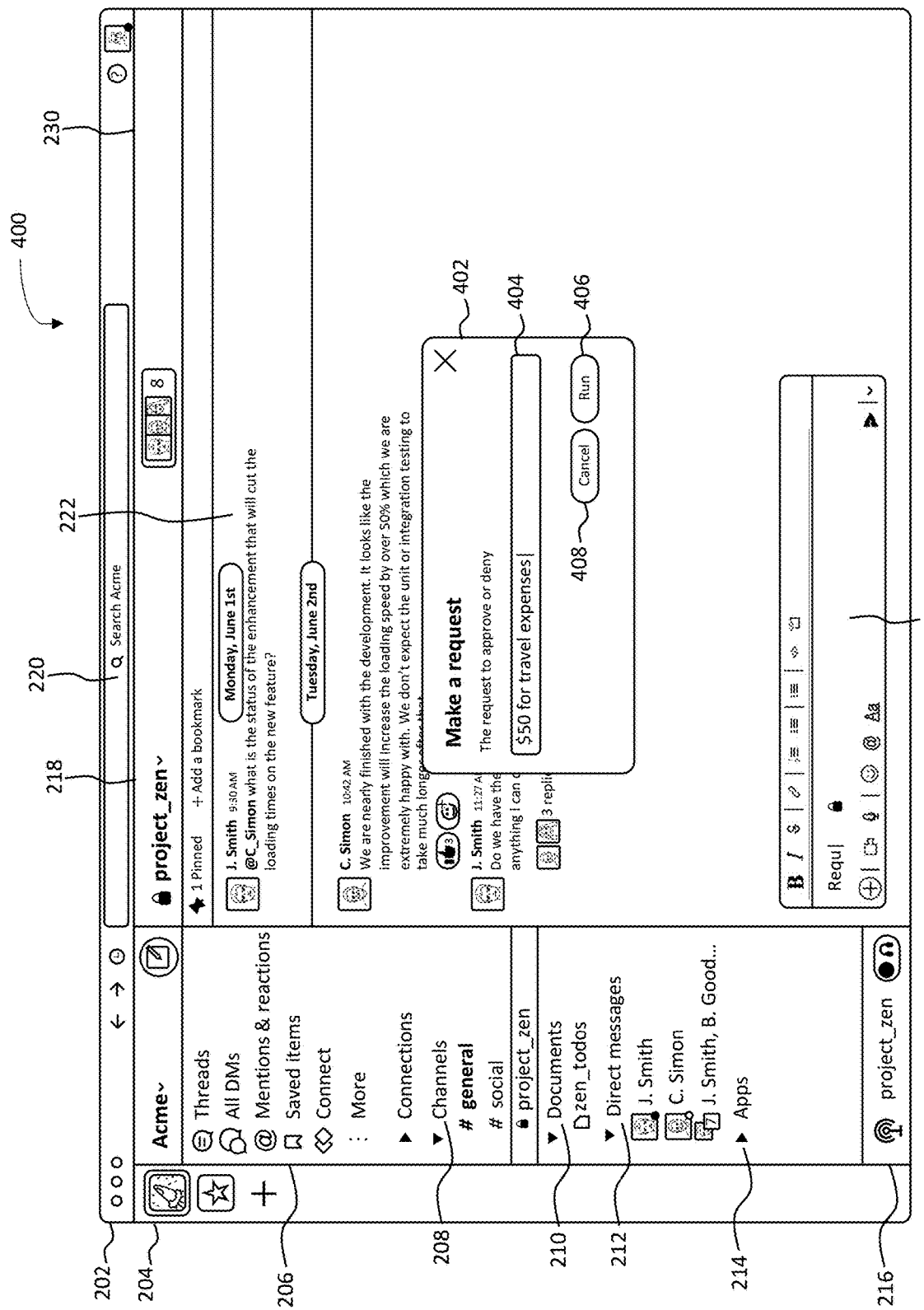
FIG. 4A depicts an exemplary user interface for a button within a channel relating to some embodiments.

FIG. 4A illustrates user interface 400 with respect to an exemplary scenario relating to some embodiments of the invention. In some embodiments, the user interface 400 may be similar to the user interface 200, as described above, and comprise similar elements, as shown. Further, in some embodiments, the user interface 400 may be displayed to a first user. In one example, the first user wishes to generate a request button to be posted within a channel of the group-based communication system. Accordingly, the first user may generate the request button, for example, by typing into the compose pane 228, as shown. In some embodiments, the first user may generate the request button using a slash command, a shortcut, as well as other suitable techniques not explicitly described herein. In some embodiments, the first user may begin to type the word "request" into the compose pane 228, which causes display of a suggestion menu including a make request shortcut.

In some embodiments, a generate request modal 402 may be generated for display within the user interface 200, as shown, including a text input 404 for adding a description to the request. In some embodiments, the text input 404 comprises a multiline input allowing the user to input multiple lines of text, variables, or other characters, as well as combinations thereof. Further, in some embodiments, the generate request modal 402 comprises a run actuator 406 configured to activate the generated request button and a cancel actuator 408 configured to terminate creation of the request button. In some embodiments, selection of the cancel actuator 408 closes the generate request modal 402 and returns to a previous page of the user interface 400. In some embodiments, selection of the run actuator 406 posts an associated button within a context of the group-based communication system, such as, for example, within a channel.

Figure 4B:
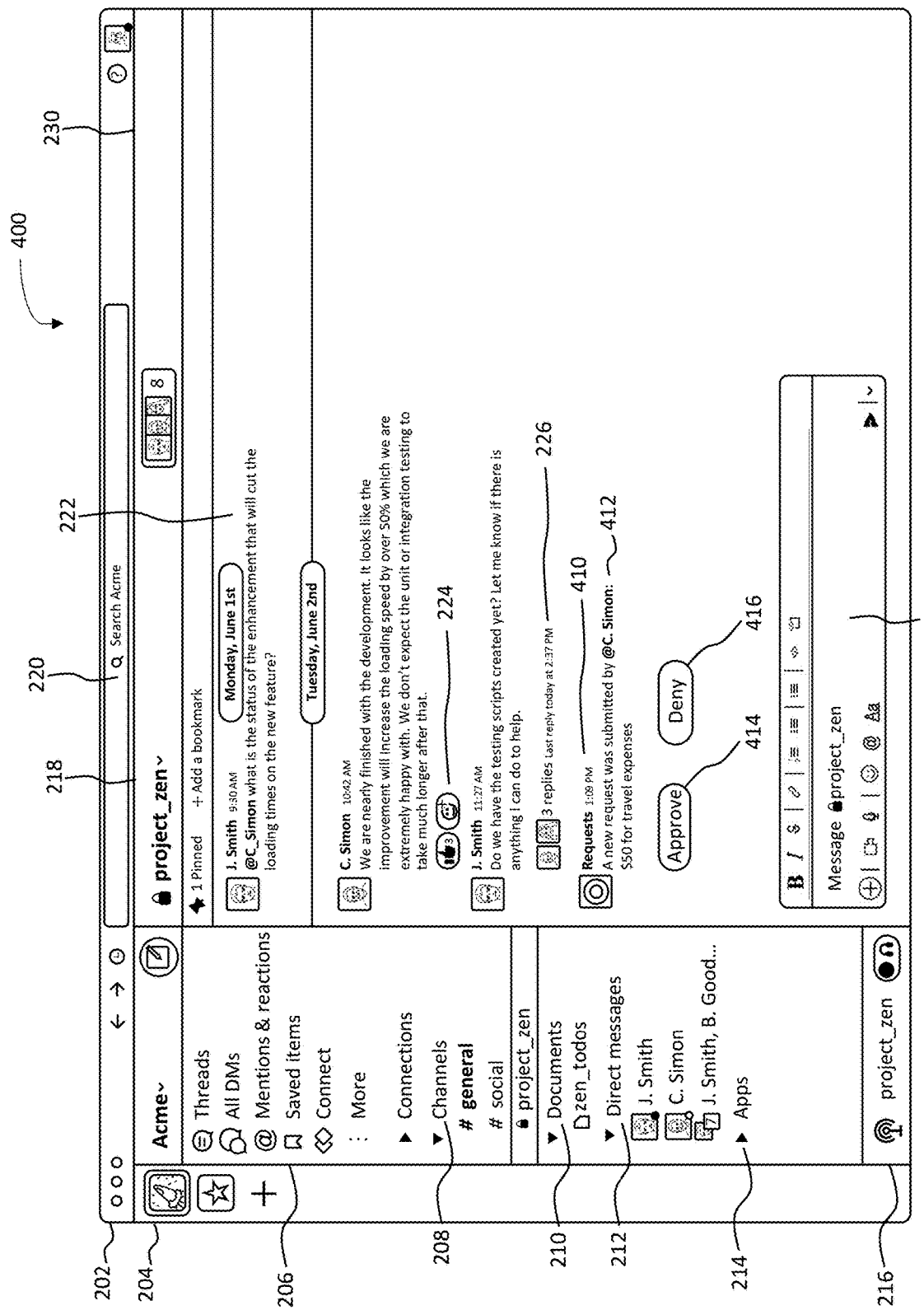
FIG. 4B depicts an exemplary user interface for a button within a channel relating to some embodiments.

FIG. 4B illustrates the user interface 400 with respect to the continued exemplary scenario described above relating to some embodiments of the invention. In some embodiments, the user interface 400, as depicted in FIG. 4B may be displayed to one or more other users, for example, after the first user selects the run actuator 406 shown in FIG. 4A. In some embodiments, a request button 410 may be posted within the channel, as shown. Here, the request button 410 comprises a description 412 of the request, which may correspond to the text input 404 of FIG. 4A. Further, in some embodiments, the description 412 further comprises an indication of which user generated the request button 410, as shown. Additionally, in some embodiments, the request button 410 includes an approve option 414 and a deny option 416. In some embodiments, the approve option 414 and the deny option 416 may only be displayed to one or more users with specific approval permissions. For example, embodiments are contemplated in which only administrator users are able to approve or deny the generated request. In some embodiments, each of the approve option 414 and the deny option 416 of the request button 410 are configured to initiate a workflow. For example, the approve option 414 may initiate an approval workflow and the deny option 416 may initiate a denial workflow.

In some embodiments, the request button 410 may be associated with an external request application configured to handle request related matters such as tracking the status of a plurality of requests. For example, the group-based communication system may interface with the external request application via an API that provides bidirectional communication between the group-based communication system and the external request application. Here, a request table storing information regarding various requests and their statuses may be generated and updated by the external request application based on activity within the group-based communication system, such as a user approving a request by selecting the approve option 414 of the request button 410. Alternatively, embodiments are contemplated in which the request table may be natively hosted by the group-based communication system. In some embodiments, the request table may be updated by the workflow initiated by actuation of the request button 410, such as, for example, a user selecting either of the approve option 414 or the deny option 416.

Figure 4C:
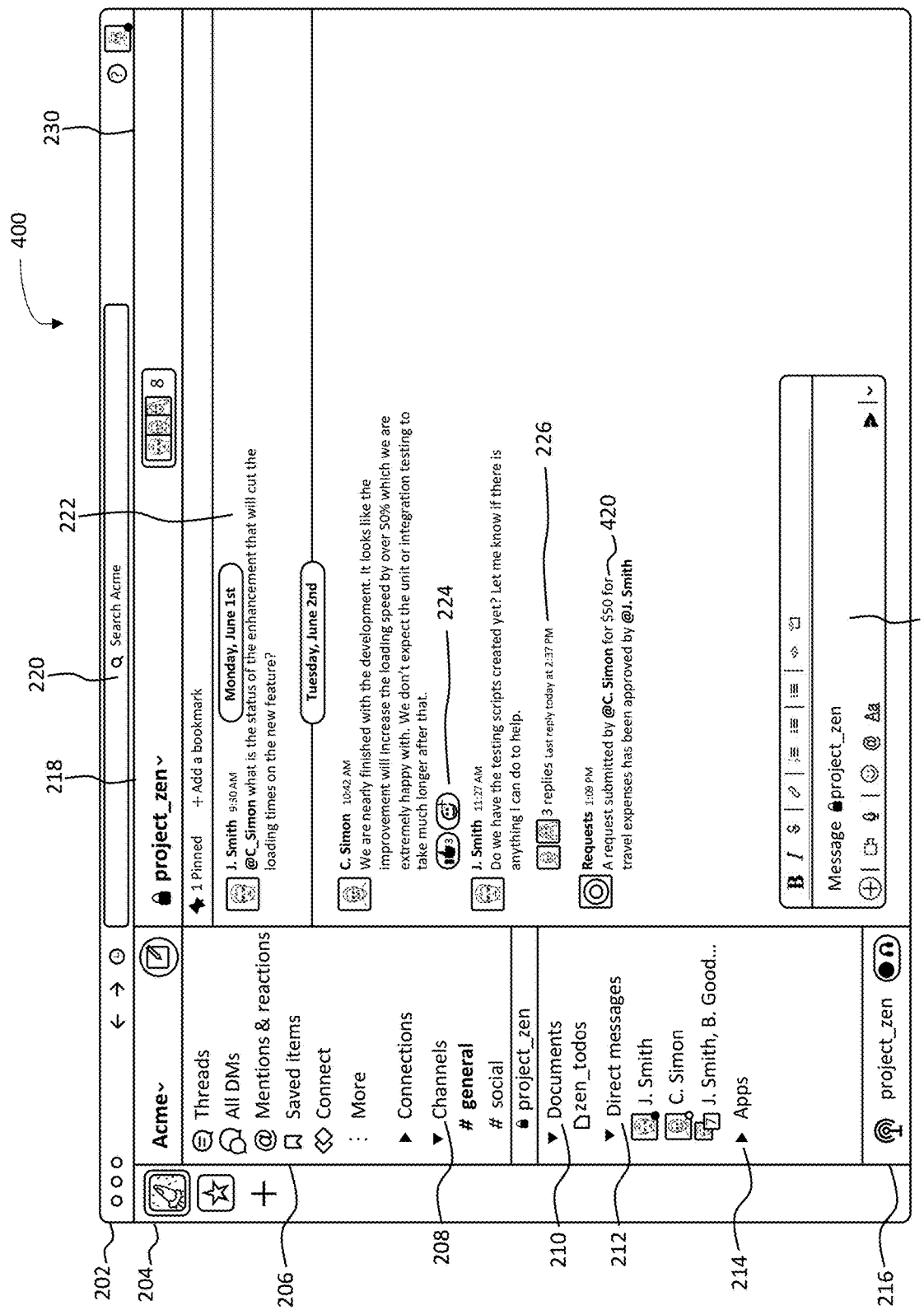
FIG. 4C depicts an exemplary user interface for a button within a channel relating to some embodiments.

FIG. 4C illustrates the user interface 400 with respect to the further continued exemplary scenario described above relating to some embodiments of the invention. In some such embodiments, the request button 410 may be replaced with a request message 420, as shown. In some embodiments, the request message 420 may be generated based at least in part on information associated with the request button 410. For example, the request message 420 may include an indication of the user who submitted the button, as well as an indication of the user who pushed the button. For example, the request message 420 may replace the request button 410 in the channel after a second user selects the approve option 414.

Accordingly, the request message 420 may include an indication of the second user, as well as an indication of the option selected by the second user.

In some embodiments, replacement of the request button 410 with the request message 420 is an operation of the workflow initiated by selection of the request button 410. For example, when a user selects the approve option 414, an approval workflow may be initiated that removes the request button 410 and generates the request message 420 based on contextual information received from the request button 410.

Buttons in Collaborative Documents

Figure 5A:
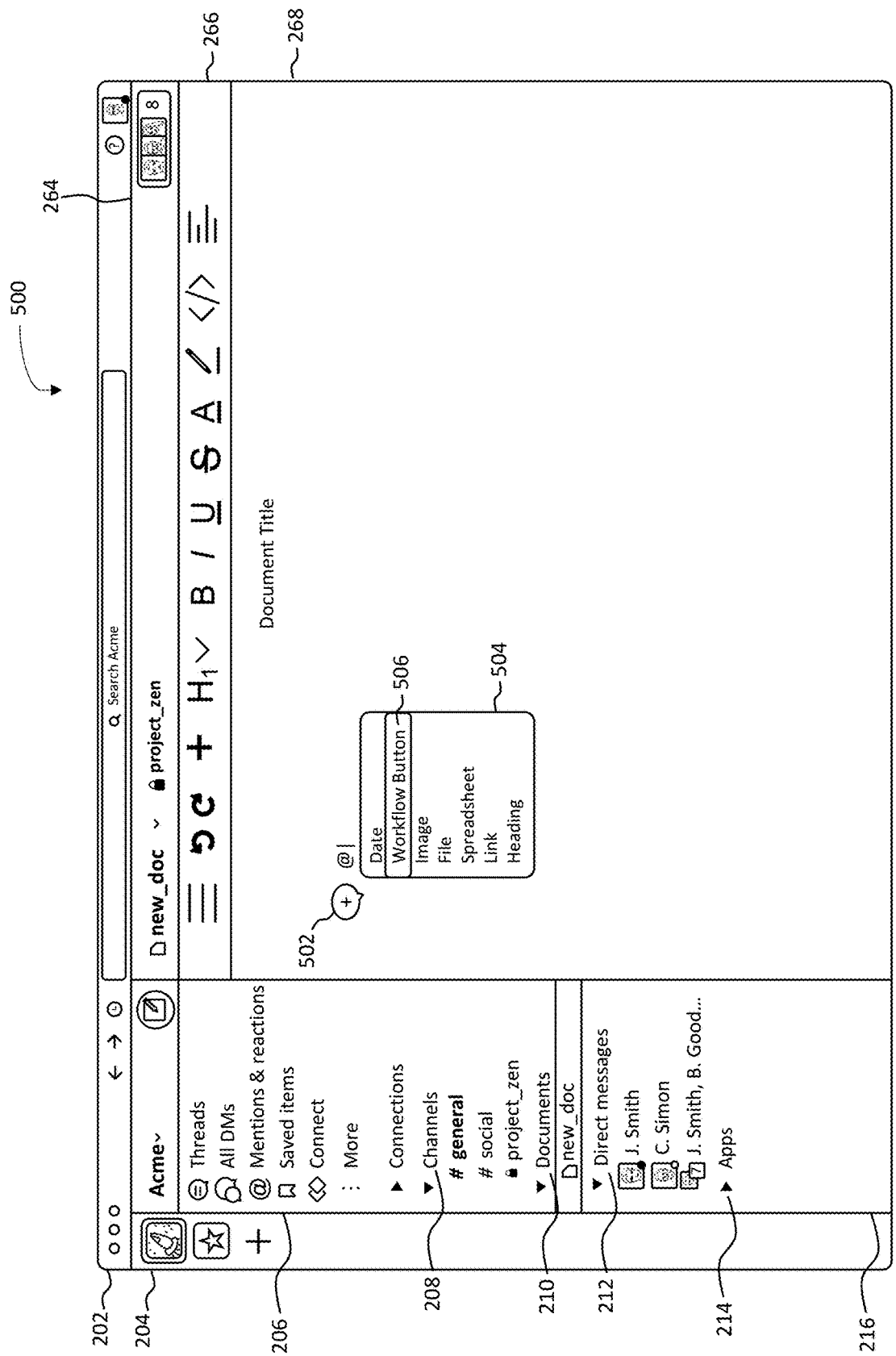
FIG. 5A depicts an exemplary user interface for a button within a collaborative document relating to some embodiments.

FIG. 5A illustrates an exemplary user interface 500 of the group-based communication system relating to some embodiments of the invention. In some embodiments, the user interface 500 includes a collaborative document 268, as shown. In one exemplary scenario the collaborative document 268 is a new blank document being edited through the group-based communication system interface. Accordingly, a user may initiate creation of a button using a slash command or, in some embodiments, by entering a comment 502 within the collaborative document 268 and typing "@" within the collaborative document 268, as shown. Here, a shortcut menu 504 may be generated for display within the user interface 500 including a plurality of options for selection by the user. In some embodiments, the plurality of options of the shortcut menu 504 may include a workflow button option 506, as shown, for initiating creation of a workflow button within the collaborative document 268. Alternatively, or additionally, in some embodiments, users may initiate creation of buttons using a variety of other means. For example, in some embodiments, buttons may be posted within the group-based communication system by copying and pasting, a drag and drop feature, or other suitable methods of posting. In some embodiments, buttons may be included within messages posted within any of a channel, a direct message channel, or a collaborative document.

Figure 5B:
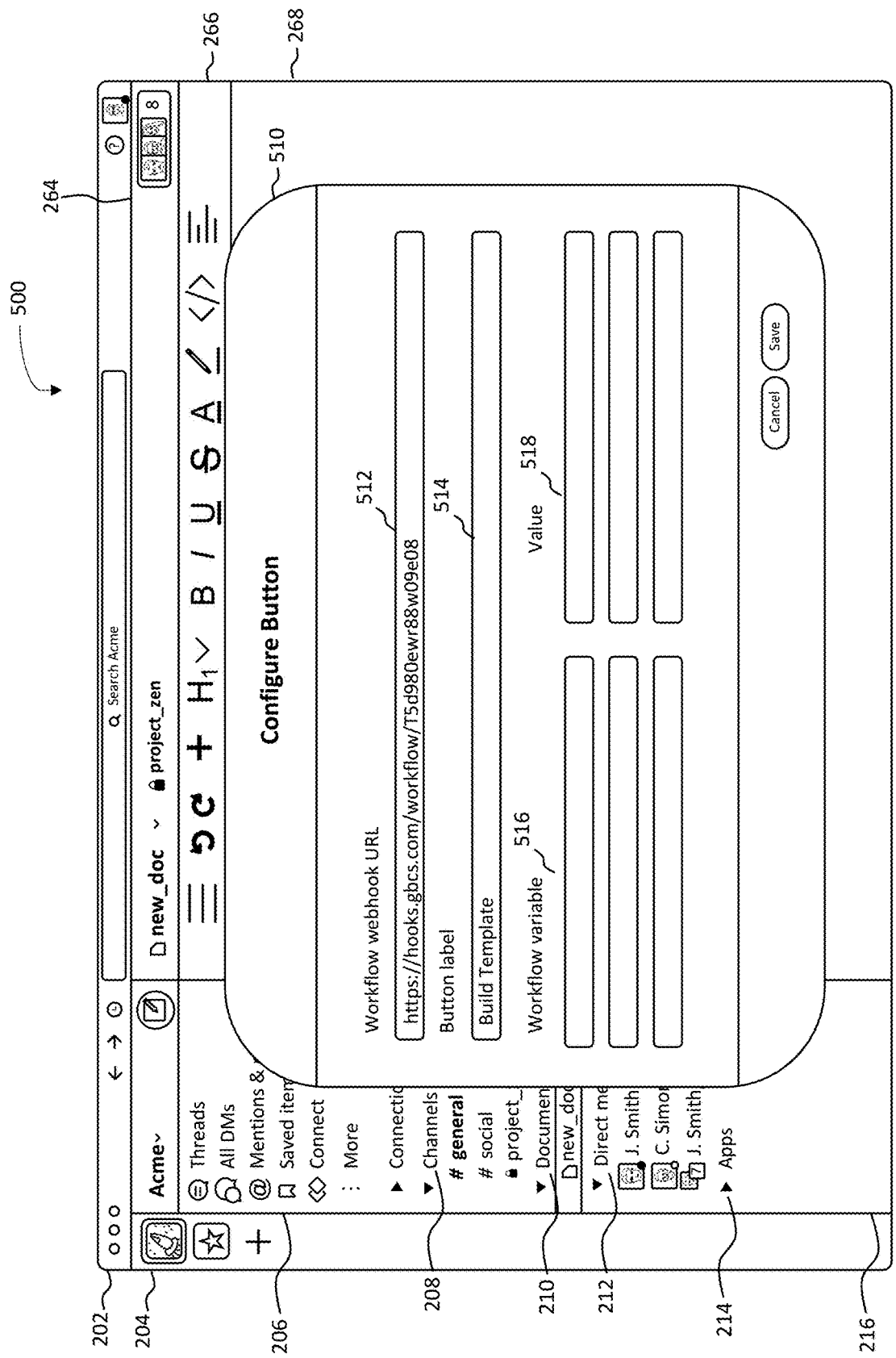
FIG. 5B depicts an exemplary user interface for a button within a collaborative document relating to some embodiments.

FIG. 5B illustrates the exemplary user interface 500 with respect to the exemplary scenario described above relating to some embodiments of the invention. In some embodiments, selection of the workflow button option 506 causes display of a button configuration modal 510, as shown. However, it should be understood that many other means of accessing the button configuration modal 510 are also contemplated. For example, in some embodiments, the button configuration modal 510 may be accessed from a settings menu, a workflow builder tool, or other suitable sections of the group-based communication system.

In some embodiments, the button configuration modal 510 comprises a workflow selection input 512, as shown, for allowing the user to select a workflow to be associated with the button. In some embodiments, a workflow may be referenced using a webhook URL corresponding to the workflow. Alternatively, or additionally, in some embodiments, the workflow may be referenced using a workflow identifier for the workflow. In some embodiments, the button configuration modal 510 further comprises a button label input 514, as shown, for receiving a button label for the button. In some embodiments, the button label may be used as a button identifier to refer to the button within the group-based communication system.

In some embodiments, the button configuration modal 510 further comprises one or more workflow variable inputs 516, as shown. In some such embodiments, the workflow variable inputs 516 may allow the button to reference one or more variables associated with the workflow. In some embodiments, the button configuration modal 510 further comprises one or more variable inputs 518, as shown. Here, the variable inputs 518 may allow the user to select values corresponding to the selected workflow variables. Accordingly, the values may be passed between the button and the workflow and vice versa. For example, the button may be configured to collect one or more variables associated with either the context of the button or one or more user selections that are passed to the workflow such that the workflow may be executed based on values received from the button. In some embodiments, the button configuration modal 510 comprises any number of additional features or inputs for configuring buttons.

The button configuration process is described above using the exemplary button configuration modal 510, however, it should be understood that, in some embodiments, various other means of button configuration are also contemplated. For example, in some embodiments, button configuration may be accessed via a settings menu, a separate button configuration page, or a window displayed within the user interface 500 of the group-based communication system. In some embodiments, at least a portion of the inputs of the button configuration modal 510 may be automatically filled based on previous user selections. In some embodiments, the user may finalize creation of the button by selecting a save option included within the button configuration modal 510.

In some embodiments, buttons may be configured to include additional button parameters. For example, in some embodiments, buttons may be associated with a predetermined expiration time. Here, a predetermined time period may be set for buttons posted within the group-based communication system to expire. In one example, a button may be posted in a channel with a predetermined expiration time of 1 hour. Accordingly, the button will persist within the channel for one hour after being posted. In this example, the button will expire after one hour and may be automatically deleted. It should be understood that one hour is just one example and that many other expiration times are also contemplated, for example, 1 minute, 15 minutes, 1 day, 1 month, or any other time period. In some embodiments, buttons may be manually deleted. For example, the user who posted the button or another user may select the button and choose a delete option to remove the button from the context in which it was posted. In some embodiments, the delete option may be accessed, for example, by right clicking the button. However, a variety of other operations may be performed to delete the button. Additionally, in some embodiments, a button may be generated or appear based on one or more given criteria within the group-based communication system or other parameters such as the contextual parameters described herein. In some embodiments, additional button options are also contemplated. For example, in some such embodiments, users may be able to selectably edit various parameters of the appearance and/or the functionality of a given button. Further, buttons may be permanent such that they do not expire after any time period. In some embodiments, users may be able to configure the predetermined time period or set buttons as permanent. Further still, in some embodiments, buttons may be pinned within a channel, canvas, collaborative document, or other context of the group-based communication system such that they are not deleted. In some embodiments, buttons may be configured to be deleted based on some event rather than a time period. For example, a button may be configured to be deleted after it has been selected. It should be understood that, in some embodiments, deleting a button refers to removing the button from the virtual space within the group-based communication system. However, the button may still be saved for later use such that it may be posted again in the same virtual space or within another context. Additionally, in some embodiments, buttons are contemplated which trigger deletion of other linked or grouped buttons. For example, in some embodiments, a first button may be associated with one or more other buttons within the group-based communication system. Here, a workflow may be initiated from the first button that deletes the one or more associated buttons. In one example, a group of buttons may be related, such as a group of buttons in which each button contains a mutually exclusive selection option for the user. Accordingly, if the user selects one of the buttons all of the related buttons may be automatically deleted such that the user cannot select more than one of the related buttons.

One benefit of the buttons and workflows described herein is that they may be generated and configured without requiring users to hard code the various functions and parameters. For example, the button configuration modal 510 or a similar builder tool interface may be used to select specifics for how the buttons and workflows are implemented within the group-based communication system. Accordingly, users are able to configure parameters for the buttons and associated workflows without code. However, it should be understood that, in some embodiments, developer users may be able to configure buttons and workflows using any combination of code and a builder tool. Accordingly, both advanced developer users and standard users may be able to configure buttons.

Figure 5C:
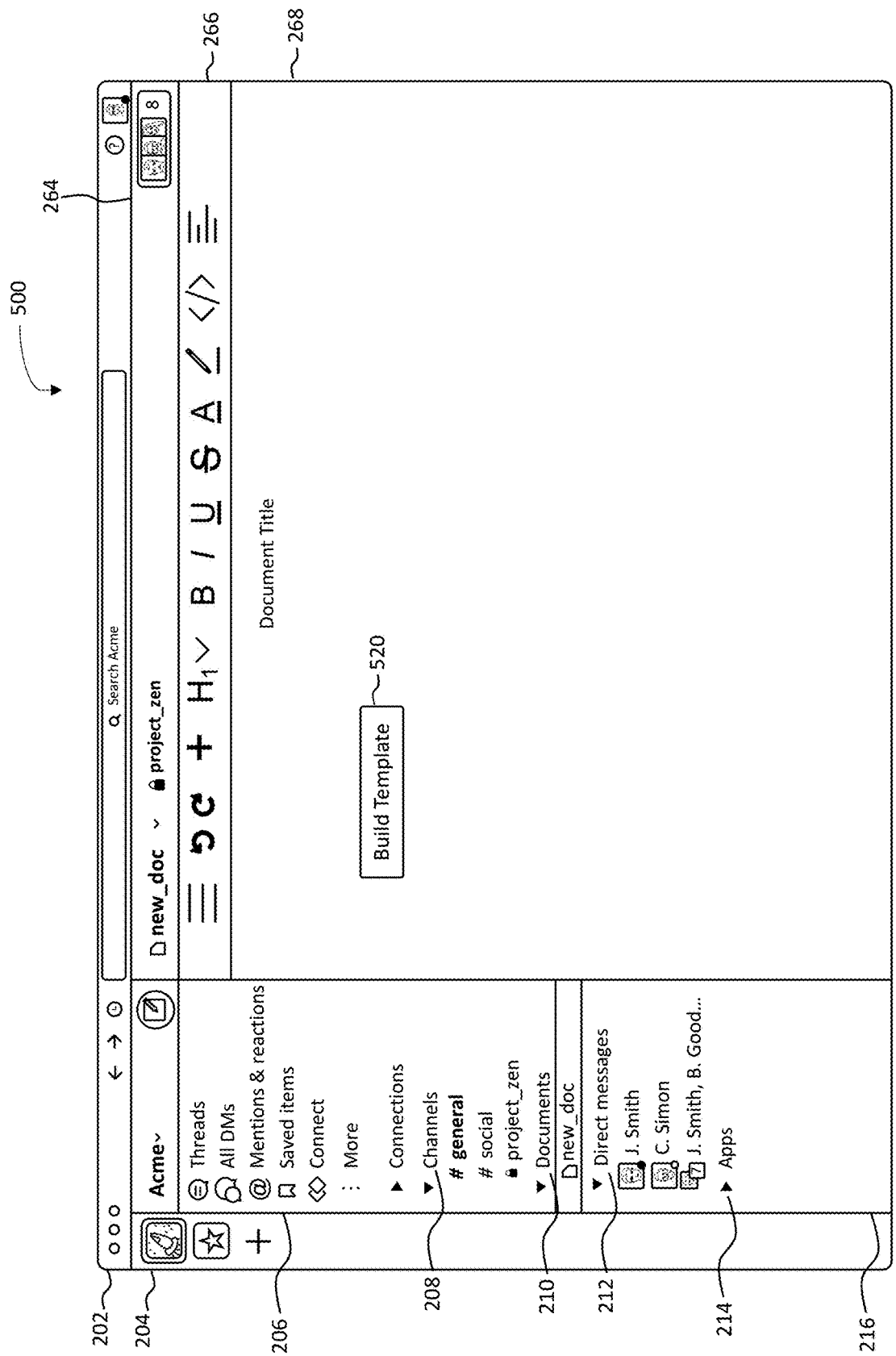
FIG. 5C depicts an exemplary user interface for a button within a collaborative document relating to some embodiments.

FIG. 5C illustrates the user interface 500 with respect to the exemplary scenario described above relating to some embodiments of the invention. In some embodiments, after the user has configured the button, for example, by selecting a save option of the button configuration modal 510, a button 520 may be generated for display within the user interface 500, as shown. In some embodiments, the button 520 may include the selected button label, as shown. In this exemplary scenario, the button 520 is a build template button associated with a build template workflow. For example, the build template workflow may be a previously configured workflow for generating a specific type of document template within the collaborative document 268. In some embodiments, such a workflow may be associated with the button 520 using a workflow webhook URL of the workflow. In some embodiments, the button 520 may be inserted within the collaborative document 268 at a position corresponding to the comment 502 inserted by the user, as shown.

Figure 5D:
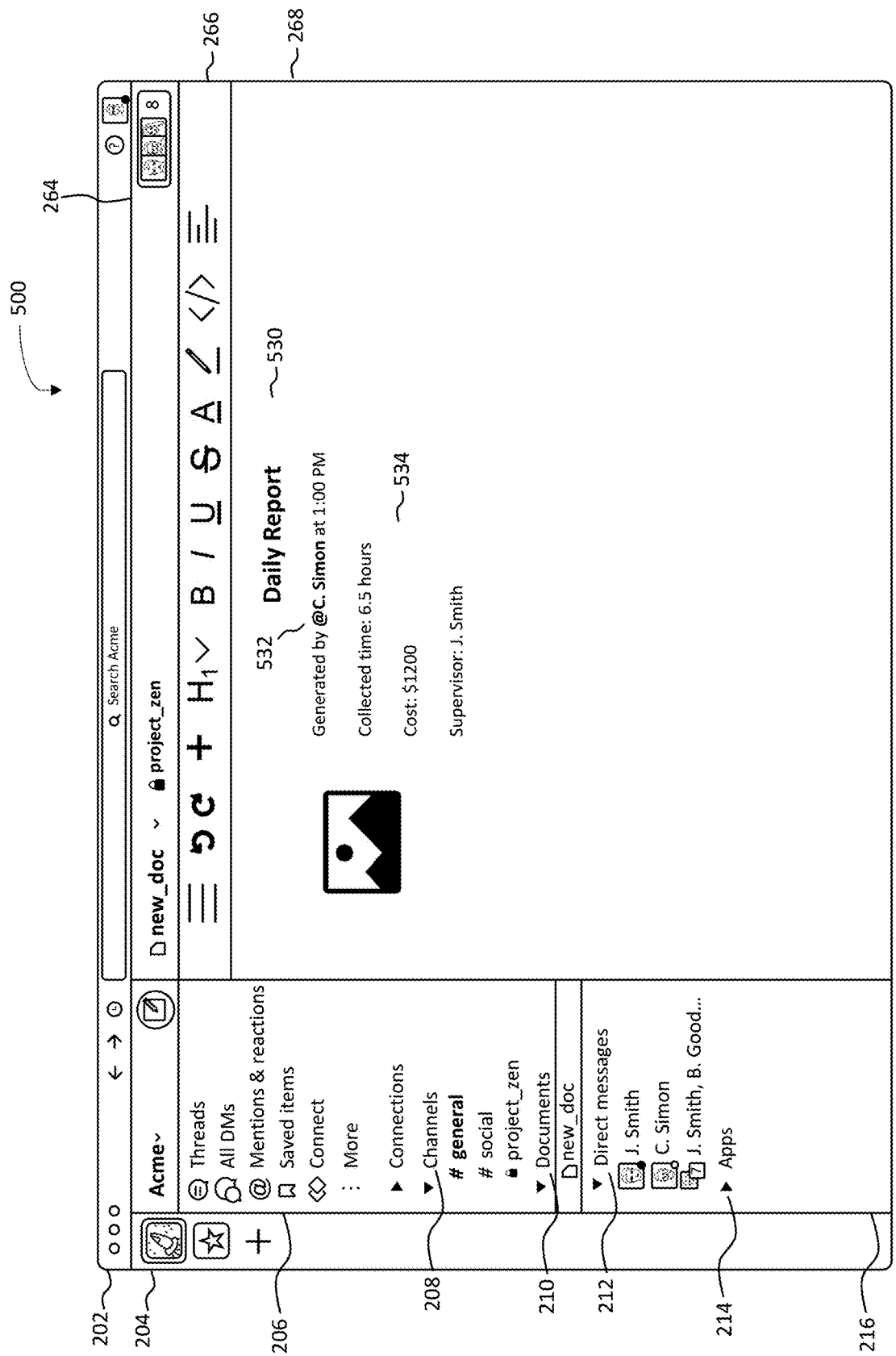
FIG. 5D depicts an exemplary user interface for a button within a collaborative document relating to some embodiments.

FIG. 5D illustrates the user interface 500 with respect to the exemplary scenario described above relating to some embodiments of the invention. Here, after activation of the button 520 a document template 530 may be automatically generated within the collaborative document 268, as shown. In some embodiments, various values of the document template 530 may be automatically filled based on data associated with the button selection. For example, in some embodiments, data values may be collected for the button such as contextual values including the contextual location of the button 520 within the group-based communication system, as well as further values indicating the user who created the button and/or the user who selected the button 520. For example, in some embodiments, if a second user selects the button 520, the document template 530 may be automatically generated for the second user including the second user's username 532, as shown. Further still, in some embodiments, the workflow associated with the button 520 may be configured to automatically retrieve one or more additional values 534 associated with the user using a user identifier of the user. Accordingly, values may be retrieved from within the group-based communication system or from any number of external data sources.

The exemplary scenario described above refers to posting a button within a blank document to run a workflow for generating a document template, however, it should be understood that buttons may also be added to an existing document, for example, to automatically change a document or automatically fill in one or more input fields of a form. Further still, buttons are contemplated for reformatting documents or generating copies of an existing document. Additionally, in some embodiments, buttons are contemplated for updating a state of an existing document. For example, a button may initiate a workflow that updates a state of a document from an initial state to a document review state. Here, in some cases, the document review state will provide review related features such as track changes and review comments.

Buttons within a Resource Channel

Figure 6A:
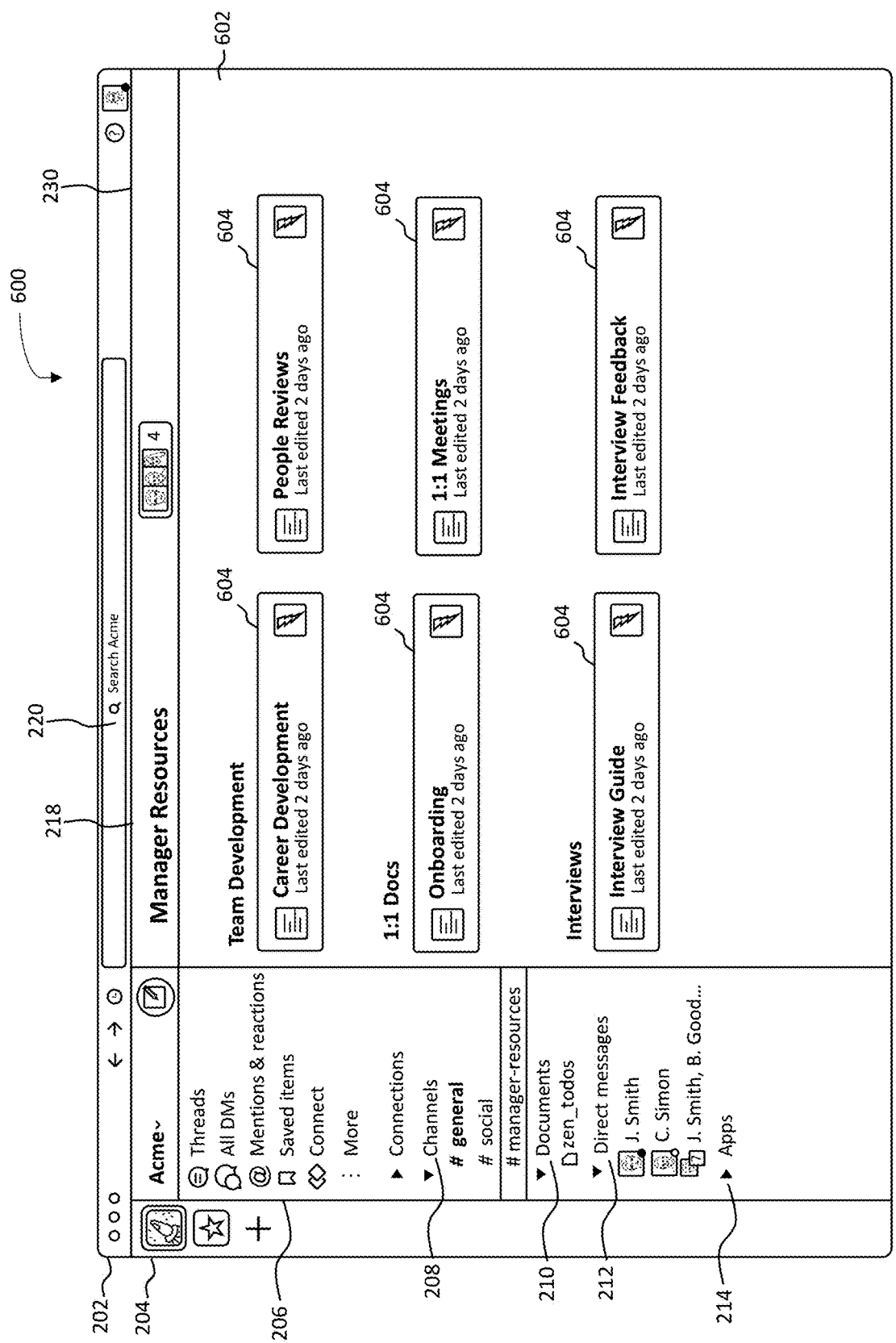
FIG. 6A depicts an exemplary user interface for a resource channel page relating to some embodiments.

FIG. 6A illustrates an exemplary user interface 600 of the group-based communication system relating to some embodiments of the invention. In some embodiments, the exemplary user interface 600 comprises a resource channel page 602, as shown. Here, the resource channel page 602 may correspond to a specific channel of the group-based communication system. In some such embodiments, the channel may be a resource channel rather than a communication channel, as described above. Here, the resource channel may be configured to access one or more resources referenced within the group-based communication system. For example, in some embodiments, the resource channel page 602 comprises one or more document buttons 604, as shown. In some such embodiments, each of the one or more document buttons 604 corresponds to a workflow for accessing or generating a respective related document. For example, a career development button may be included for generating a career development document or for accessing an existing career development document.

In an exemplary scenario of FIG. 6A, a user selects one of the document buttons 604 from the resource channel page 602. For example, the user may select the career development button to generate a career development document template using an associated document template workflow. In some embodiments, selection of one of the document buttons 604 initiates creation of a document using a document template or alternatively, accesses an existing document, as will be described in further detail below.

Figure 6B:
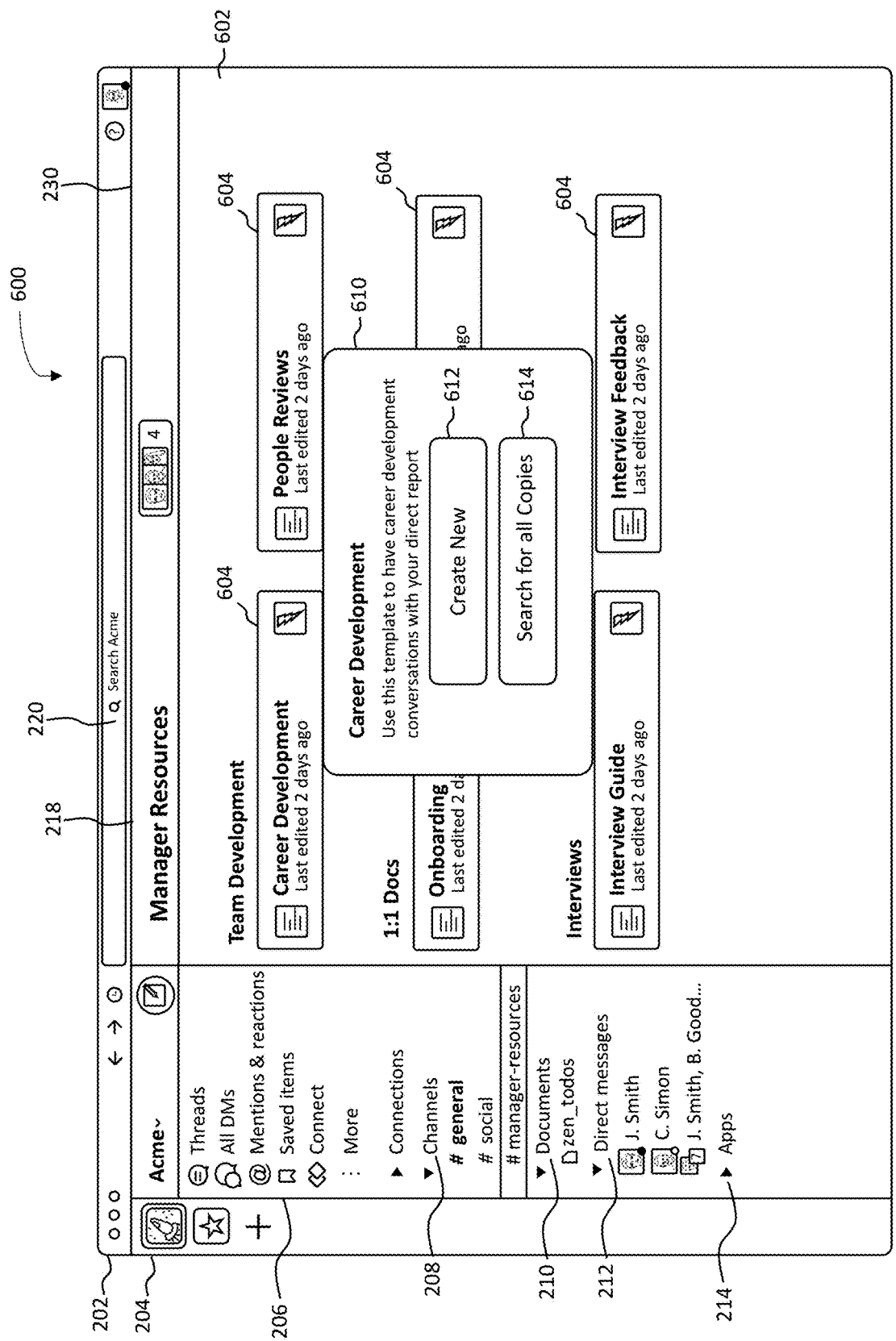
FIG. 6B depicts an exemplary user interface for a resource channel page relating to some embodiments.

FIG. 6B illustrates the user interface 600 with respect to the continued exemplary scenario described above relating to some embodiments of the invention. Here, a document selection modal 610 may be generated for display within the exemplary user interface 600, as shown. Accordingly, the document selection modal 610 may include each of a create new option 612 and a search for all copies option 614. In some such embodiments, the create new option 612 may be configured to generate a new document template, while the search for all copies option 614 may be configured to access one or more existing documents. Continuing the example above, selection of a career development button may provide the user with options to generate a new career development document based on a document template or to access one or more previously created career development documents. Accordingly, embodiments are contemplated in which the resource channel page 602 provides one or more users with an environment to access a plurality of related resources. For example, a manager user may utilize the resource channel page 602 to organize a plurality of documents and other resources relating to specific users of the group-based communication system.

Figure 6C:
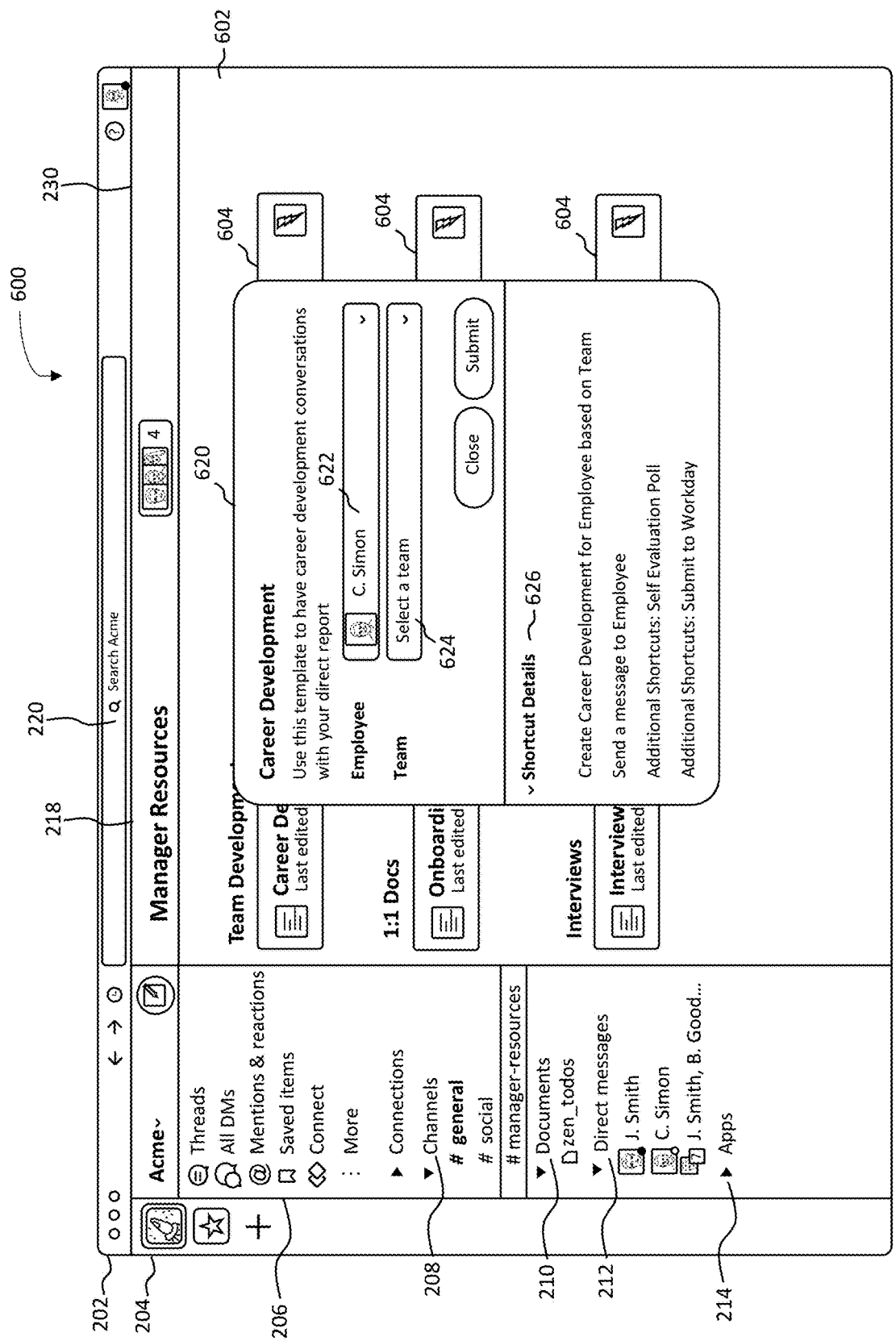
FIG. 6C depicts an exemplary user interface for a resource channel page relating to some embodiments.

FIG. 6C illustrates the user interface 600 with respect to the continued exemplary scenario described above relating to some embodiments of the invention. Here, a document template settings modal 620 may be generated for display within the user interface 600, as shown. In some embodiments, the document template settings modal 620 may be displayed in response to a user selecting one of the document buttons 604 and further selecting the create new option 612. In some embodiments, the document template settings modal 620 comprises an employee selection input 622 for receiving an employee indicator and a team selection input 624 for receiving a team indicator. In some embodiments, a document template may be generated based at least in part on the selections made within the document template settings modal 620.

In some embodiments, the document template settings modal 620 further comprises a list of shortcut details 626 corresponding to the button and associated workflow. In some embodiments, the list of shortcut details 626 comprises one or more details related to various operations of the workflow, as shown. For example, the list of shortcut details 626 may comprise a description of one or more steps of the workflow, as well as other variables of the workflow. In some embodiments, the user may be able to edit workflow parameters within the document template settings modal 620. For example, the user may add, edit, or remove workflow steps, as well as set and change various other workflow variables. Further, once the user has finished editing the document template settings modal 620, the user may select a submit option of the document template settings modal 620. In some embodiments, the selection of the submit option initiates execution of the workflow within the group-based communication system, as will be described in further detail below.

Figure 6D:
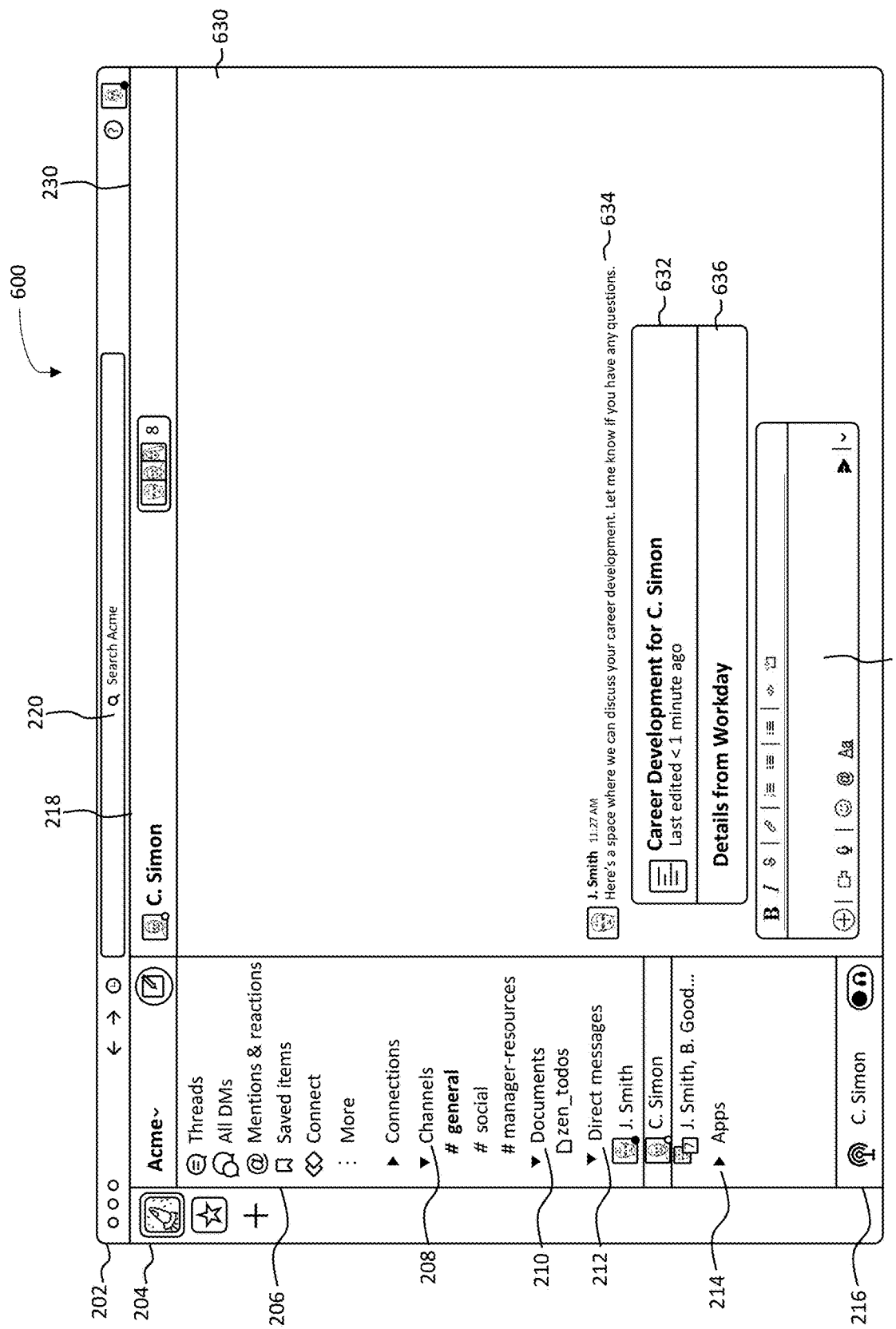
FIG. 6D depicts an exemplary user interface for a button within a direct message relating to some embodiments.

FIG. 6D illustrates the user interface 600 with respect to the continued exemplary scenario described above relating to some embodiments of the invention. In some embodiments, after selection of a submit option from the document template settings modal 620, the workflow causes a document to be generated and posted within a specific communication channel of the group-based communication system. For example, in some embodiments, a document link 632 associated with the generated document may be automatically posted along with a message 634 within a direct message communication channel 630 with a user referenced within the employee selection input 622, as shown. In some embodiments, a document preview 636 may be generated for display on the user interface 600, as shown, showing a preview associated with the generated document.

Figure 6E:
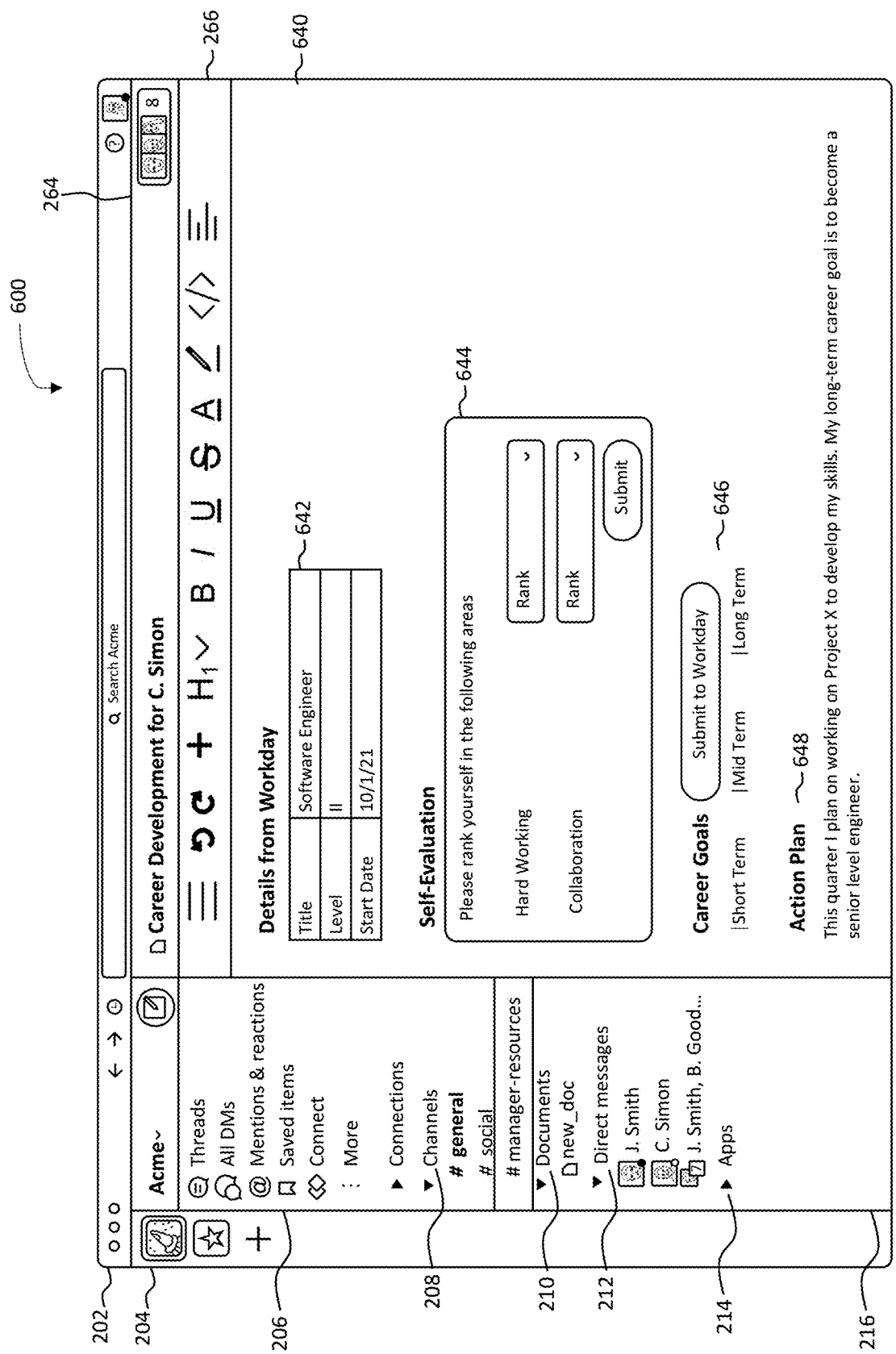
FIG. 6E depicts an exemplary user interface for an automatically generated collaborative document.

FIG. 6E illustrates the user interface 600 with respect to the continued exemplary scenario described above relating to some embodiments of the invention. Here, an exemplary document 640 may be automatically generated, as shown, based on the document template associated with the selected document button 604. For example, the corresponding workflow may include one or more steps for generating the document 640 and auto-filling various fields within the document 640. In some embodiments, the document 640 may be a collaborative document similar to as described above with respect to collaborative document 268 such that the document 640 may be edited in real time by one or more distinct users within the group-based communication system.

The exemplary document 640 may comprise any number of document components such as an automatically generated data table 642, as shown. For example, the data table 642 may comprise user information retrieved from the group-based communication system or from one or more external sources, such as an employee data application. For example, the workflow may be configured to retrieve user information associated with the selected employee from WORKDAY or another external employee record service. In some embodiments, the document 640 further comprises a self-evaluation section 644, as shown. In some embodiments, the self-evaluation section 644 allows a user to fill out and submit a self-evaluation form. Embodiments are contemplated in which the generated document 640 comprises one or more buttons. For example, in some embodiments, the self-evaluation section 644 may be incorporated as one or more buttons tied to yet another workflow for generating and submitting a self-evaluation form.

In some embodiments, the exemplary document 640 further comprises a career goals section 646 allowing the user to input various different types of career goals, such as, for example, short-term, mid-term, and long-term goals, as shown. In some embodiments, the career goals section 646 may also be incorporated as a button that allows the user to generate a career goals form for submission to an external application such as WORKDAY. Further still, the exemplary document 640 may include an action plan section 648 allowing the user to define an action plan for completing the user's selected career goals.

In some embodiments, each of the components and features within the automatically generated document 640 may be created by a workflow initiated by the document button 604. For example, in some embodiments, each document button 604, as shown in FIG. 6A, is associated with a different workflow for generating a specific type of document. Accordingly, the corresponding workflows may include instructions for generating the respective document. For example, the career development document button may include instructions for generating each of the data table 642, the self-evaluation section 644, the career goals section 646, and the action plan section 648.

It should be understood that the career development example described above is just one example and that a variety of other types of buttons and documents are also contemplated and considered for further embodiments of the invention. For example, document templates may be generated based on any combination of user defined parameters. Accordingly, embodiments are contemplated in which users of the group-based communication system are able to create custom user-defined buttons and workflows for executing various operations within the group-based communication system, as well as within other external applications.

RSVP Button

Figure 7A:
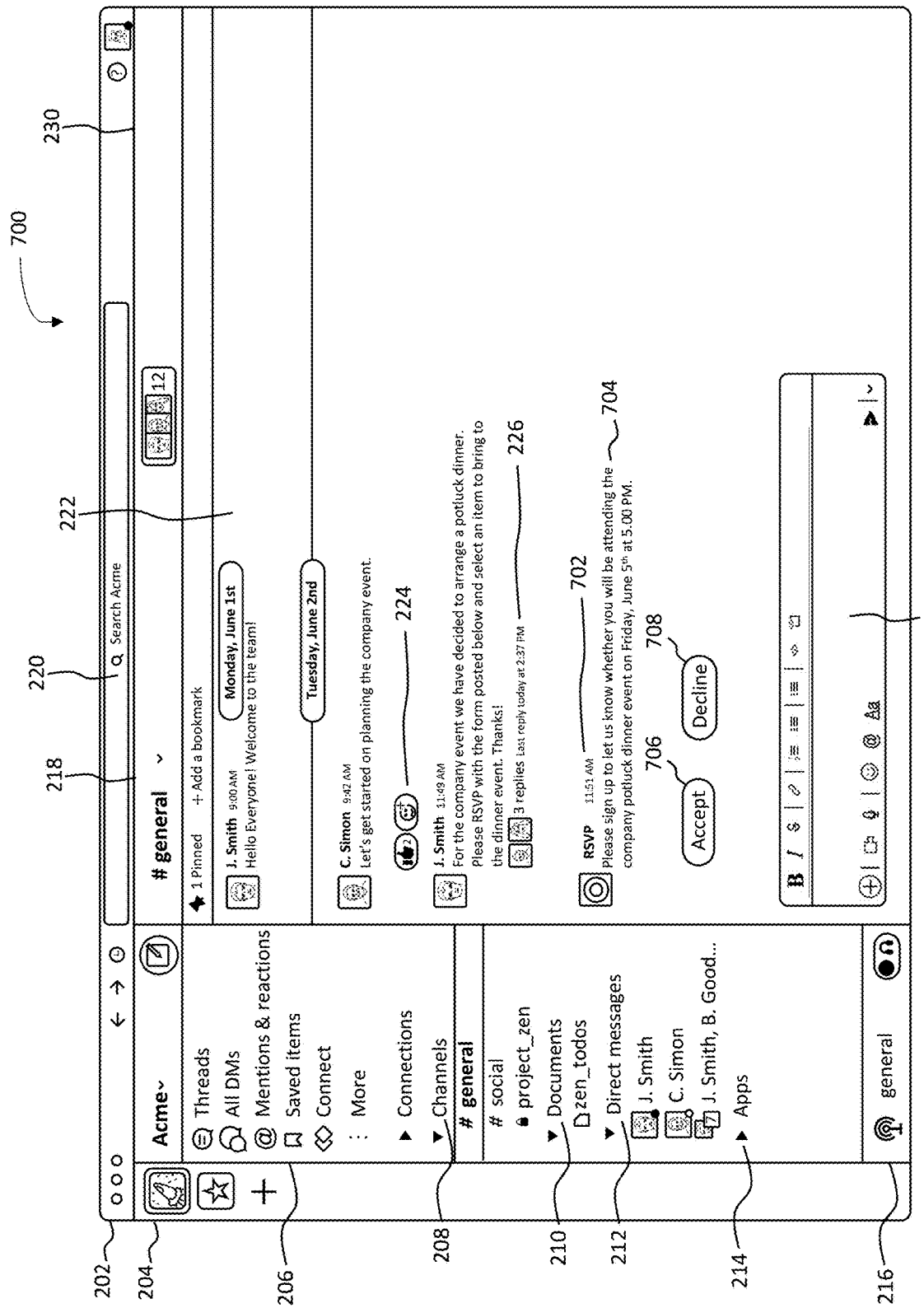
FIG. 7A depicts an exemplary user interface for an RSVP button relating to some embodiments of the invention.

FIG. 7A illustrates an exemplary user interface 700 relating to some embodiments of the invention. In some embodiments, the user interface 700 comprises the channel pane 218, as shown, including any number of messages 222, reactions and reaction button 224, and thread reply previews 226. In one exemplary scenario, an RSVP button 702 is posted in the channel, as shown. Here, the RSVP button 702 may comprise a button message 704 including a description of the RSVP button 702. In some embodiments, the RSVP button 702 comprises an accept option 706 and a decline option 708 allowing users to accept an RSVP to an associated event from within the channel pane 218. In one example, a first user accepts the RSVP by selecting the accept option 706 of the RSVP button 702. In some embodiments, the RSVP button 702 may be posted within the channel using any of the techniques described herein for adding a button, as well as various other suitable button generation techniques not explicitly described herein.

Figure 7B:
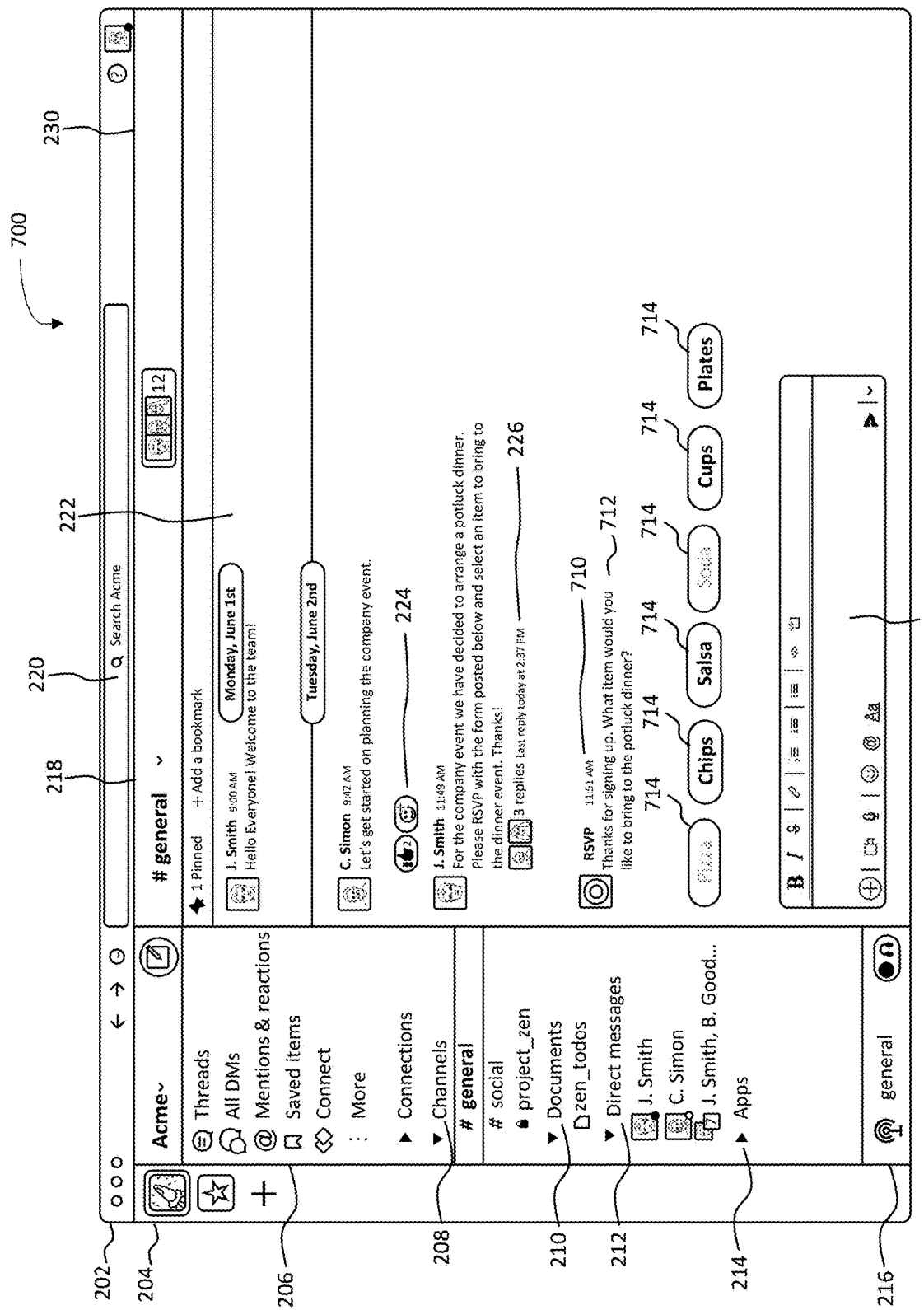
FIG. 7B depicts an exemplary user interface for an RSVP button relating to some embodiments of the invention.

FIG. 7B illustrates the user interface 700 with respect to the continued exemplary scenario described above relating to some embodiments of the invention. Here, a replacement button 710 may be generated for display within the user interface 700 in response to receiving a selection from the first user of the RSVP button 702. For example, the first user may select the accept option 706 causing the RSVP button 702 to be replaced with the replacement button 710, as shown. In some embodiments, the replacement button 710 comprises a button message 712, as shown, prompting the user to select from one or more button options 714. In this example, each of the button options 714 corresponds to an item for a company event associated with the RSVP. Accordingly, after accepting the RSVP users may be prompted to select an item that they will bring to the event. In some embodiments, certain button options may be grayed out, as shown, indicating that other users have already elected to bring those items. In some embodiments, a data table may be updated based on responses received from the RSVP button 702 and the replacement button 710, as will be described in further detail below. Additional embodiments are contemplated in which users may select from other options, such as, for example, selecting a meal from a menu for an event. Further, selection options are also contemplated that are not explicitly described herein. For example, in some embodiments, users may create manually customized buttons and workflows to provide various functionality within and outside of the group-based communication system.

The replacement button 710 is described herein as replacing the RSVP button 702, however, further embodiments are contemplated in which the replacement button 710 may be considered the same button. For example, rather than replacing the button, a state of the button may be changed, such that one or more button parameters are altered. Here, the button may be changed from an initial state to any number of subsequent states. In some embodiments, a single button may have a plurality of different states based on which user is viewing the button. For example, the button may appear differently for a user who has already selected the button as compared to a user who has not selected the button. In some embodiments, the state of the button may be altered based on any of a variety of factors, such as, for example, a workflow, an external trigger, or a user selecting the button.

FIG. 7C illustrates an exemplary data table 720 with respect to the continued exemplary scenario described above relating to some embodiments of the invention. In some embodiments, the data table 720 may be natively included within the group-based communication system. Alternatively, in some embodiments, the data table 720 may be remotely accessed from one or more external sources. Further still, in some embodiments, the data table 720 may be included as a table within a collaborative document such as the collaborative document 268 described above.

In some embodiments, the data table 720 may be generated and/or updated based on responses and selections received with respect to buttons posted within the group-based communication system. For example, the data table 720 may include an RSVP data table corresponding to the company event described above. Accordingly, the data table 720 may include a first column 722 including an event identifier, a second column 724 including a guest identifier, a third column 726 including a response status, and a fourth column including an item identifier 728 indicating the item that each user has elected to bring. Accordingly, embodiments are contemplated in which the data table 720 is automatically generated, for example, by a create event workflow. In some embodiments, the values within the table may be automatically updated by workflows corresponding to the RSVP button 702 and the replacement button 710. For example, in some embodiments, the data table 720 may be automatically updated in response to receiving one or more selections from a user within the channel. In some such embodiments, the corresponding workflow may be configured to automatically add an additional row to the data table 720 for each respective user.

Embodiments are contemplated in which buttons may be displayed differently for each user. For example, in some embodiments, the RSVP button 702 may only be displayed to users who have not yet responded. Further, the button options 714 of the replacement button 710 may be updated based at least in part on data from the data table. For example, as users opt to bring items by selecting the button options 714 those button options may be removed or grayed out when displayed to subsequent users. Accordingly, embodiments are contemplated in which the inputs of buttons may be configured to receive values from external or natively stored data tables or other data sources. Further still, embodiments are contemplated in which buttons may be displayed differently to each user based on the respective user's role within the group-based communication system. For example, in some embodiments, additional information and button parameters may be visible to an administrator user that are not visible to a standard user. Additionally, in some embodiments, the actions carried out by an associated workflow may further depend on the user's role or other user-specific parameters within the group-based communication system. For example, in some embodiments, workflows may be allowed to perform actions based on the permissions of the user who selected the associated button. In one example, a button is posted within a channel and the associated workflow for the button is configured to generate a new shared channel between the selecting user's organization and another organization. Accordingly, if the user who selects the button does not have permission to create a shared channel the workflow will similarly not be able to create a shared channel. However, if a user with permission to create a shared channel selects the button the shared channel will be automatically generated. In some embodiments, a notification may be generated for the user if the workflow fails to perform an action based on permissions. For example, in some embodiments, the button may be replaced with a notification message indicating that the workflow did not create the channel because the user did not have access.

Embodiments are contemplated in which any number of additional types of data tables are included. For example, in some embodiments, buttons may be associated with a specific data table for recording which users have selected the button, or by contrast, which users have not selected the button. Accordingly, in some embodiments, buttons may be displayed to each user based on information such as user interactions with the button stored in a data table, a data store, or some other storage mechanism.

Figure 7D:
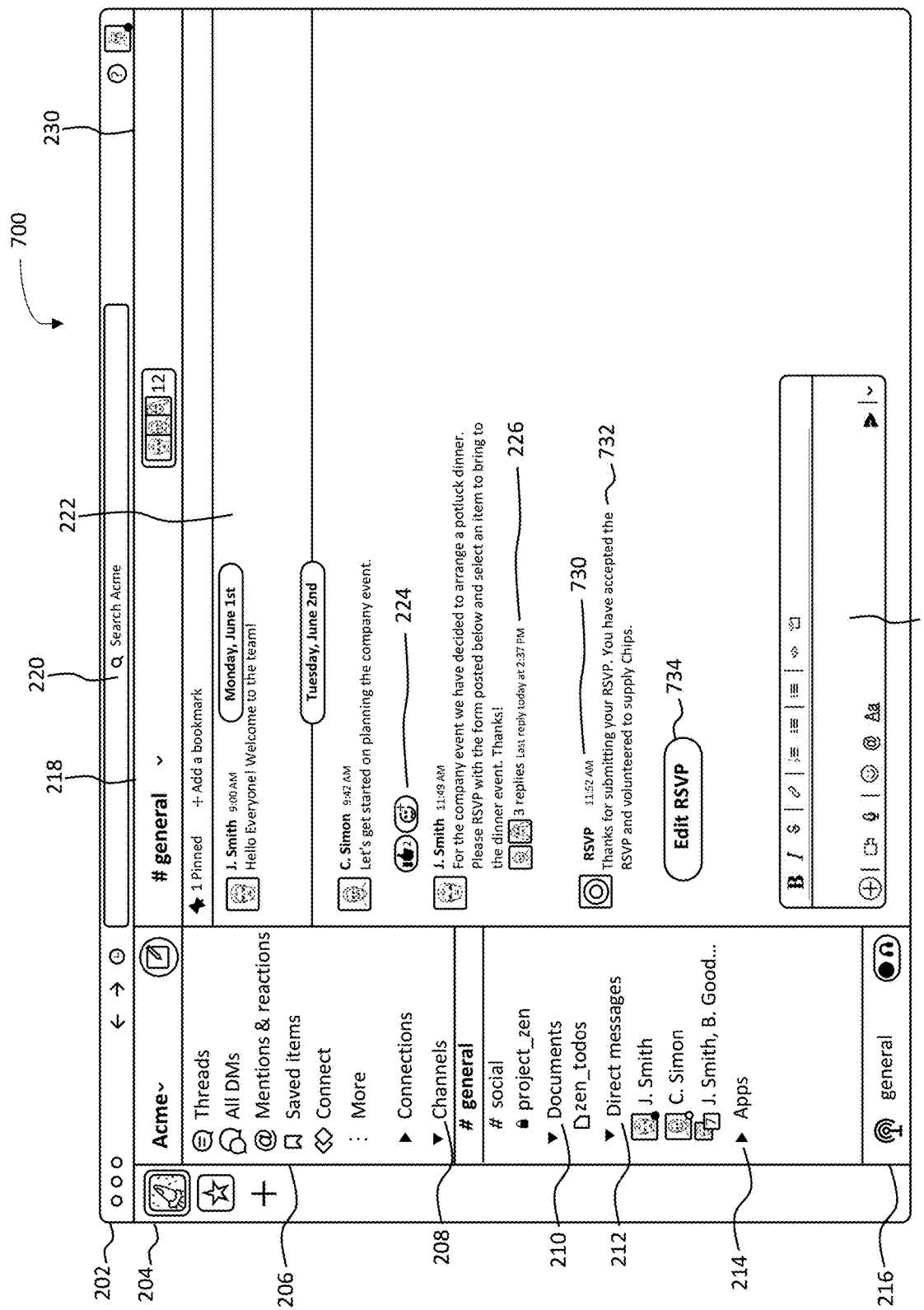
FIG. 7D depicts an exemplary user interface for an RSVP button relating to some embodiments of the invention.

FIG. 7D illustrates the exemplary user interface 700 with respect to the continued exemplary scenario described above relating to some embodiments of the invention. In some embodiments, after the user has responded to the RSVP, the RSVP button 702 and replacement button 710 may be replaced with a response message 730. Here, the response message 730 may be generated for each user such that a different response message is displayed to each respective user based at least in part on the user's response to the RSVP. For example, the response message 730 may include a description 732 indicating the user's response to the RSVP (accepted or declined). In some embodiments, an edit RSVP button 734 may be included within the user interface 700, as shown, allowing users to edit their response after it has been submitted. For example, a user may initially accept the RSVP but may change their response to declined based on a scheduling conflict. In some such embodiments, the edit RSVP button 734 allows users to update and change values stored within the data table 720. For example, users may change their responses or alter their selected item.

Buttons Directory

Figure 8:
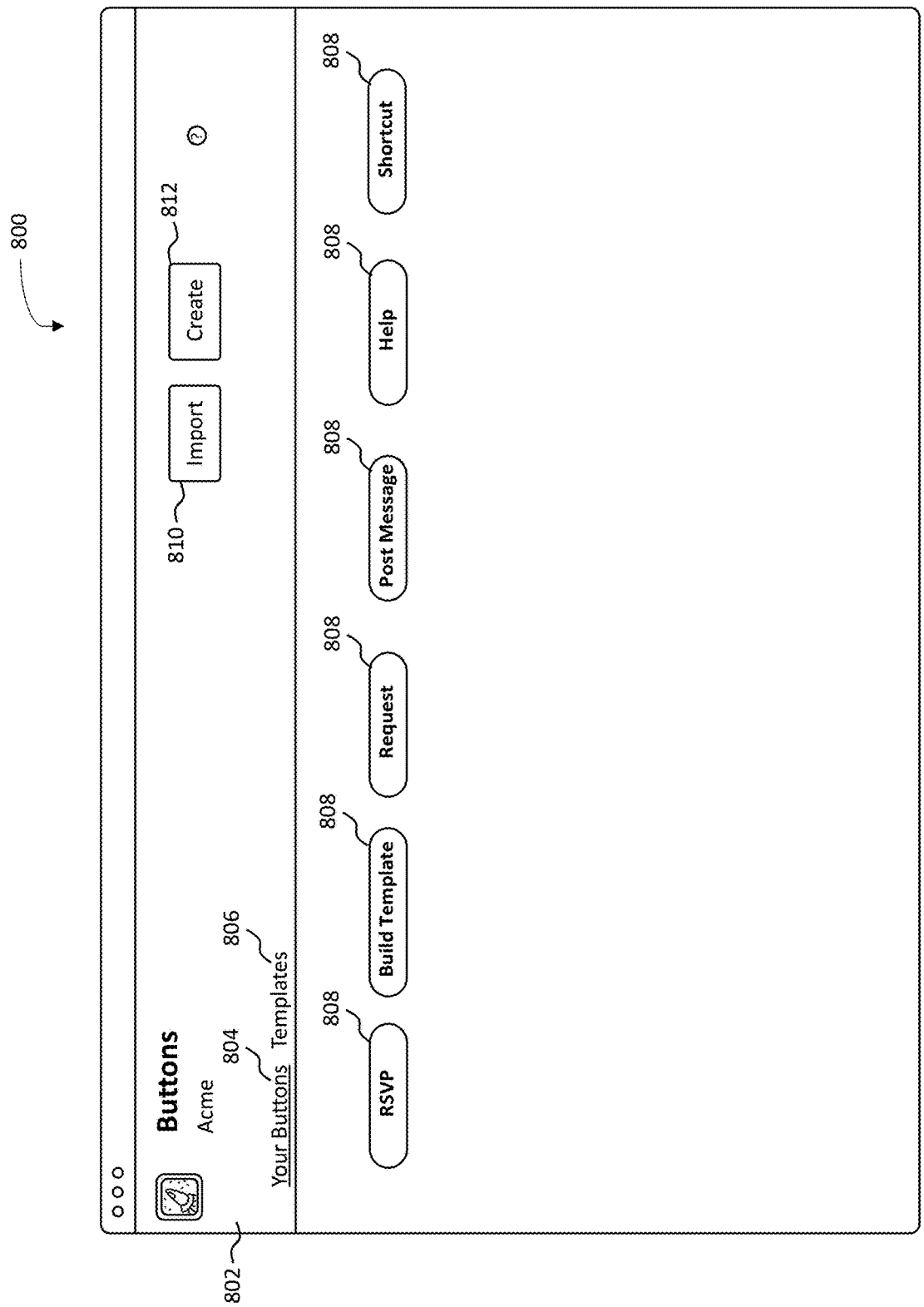
FIG. 8 depicts an exemplary user interface associated with a buttons directory relating to some embodiments.

FIG. 8 illustrates an exemplary user interface 800 associated with a buttons directory relating to some embodiments of the invention. In some embodiments, the user interface 800 may comprise a button page 802 that may be generated for display as part of the user interface 800, as shown. In some embodiments, the buttons directory may be used for any of configuring new buttons, editing existing buttons, importing existing buttons, or selecting buttons to be posted or placed at various locations and contexts within the group-based communication system. Further, in some embodiments, the buttons directory provides a space for users to curate a list of available buttons.

In some embodiments, the user interface 800 comprises an available buttons tab 804 and a buttons template tab 806, as shown. Here, the available buttons tab 804 may be used to select and edit existing buttons available to the user. For example, a user may select the available buttons tab 804 that generates a list of available buttons 808 available for selection or editing by the user, as shown. In some embodiments, the available buttons 808 may include any combination of the buttons described herein such as, for example, the RSVP button 702, the build template button 520, and the request button 410, as well as other buttons not explicitly described herein. For example, in some embodiments, a post message button may be included for automatically posting a message within a certain channel upon being pressed. It should be understood that any number of additional buttons corresponding to custom and preconfigured workflows are also contemplated.

Further, in some embodiments, additional buttons are contemplated such as, for example, a help button, as shown. In some embodiments, a help button may be posted within a context of the group-based communication system to submit a help request. In some such embodiments, the help button, when selected, may initiate a help request workflow. For example, the help request may be configured to generate a help ticket that may be sent to one or more users, such as, to customer service personnel or information technology specialists. In some embodiments, the help ticket may be augmented with contextual information automatically retrieved based on the context of the button. For example, if the user selects the help button from within a channel associated with a particular type of project the help ticket may be routed to the appropriate personnel for helping the user with that particular project. In one example, a specific user may be designated as a help source for a particular channel such that help tickets generated from the help button in that channel are routed to that specific user. In some embodiments, the help ticket may be automatically posted in a direct message to the specific user.

Embodiments are contemplated in which a shortcut button may be included. In some such embodiments, the shortcut button may be configured to provide access to some type of resource from within the group-based communication system. For example, in some embodiments, a shortcut may be used to provide quick access to a specific channel within the group-based communication system or some other resource posted within the group-based communication system. Further, embodiments are contemplated in which a shortcut button may be used to access an external resource. For example, the button may call a workflow for accessing a hyperlink to an external resource such as an external webpage, file, or video. In some embodiments, the shortcut button may include a preview associated with the corresponding resource.

Further, embodiments are contemplated in which buttons may be included to update channels or create new channels within the group-based communication system. For example, a copy channel button is contemplated that generates a new copy channel based on an existing template channel. Here, the copy channel button may be posted within the channel that is desired to be copied and used as a template. Accordingly, the button will retrieve the context of the template channel including various channel parameters such as the channel owner, the members of the channel, and the organization for the channel. In some embodiments, the channel parameters will automatically be applied within a newly created channel generated in response to actuation of the button. In some embodiments, the user who selects the button may automatically be set as the channel owner. Alternatively, in some embodiments, the existing channel members from the template channel may automatically receive invitations to the newly created channel. Further, in some embodiments, the copy channel button may be converted to a join channel button allowing users to join the new channel after it has been created. Further still, in some embodiments, such a button may only be displayed or can only be actuated by certain users. For example, in some embodiments, the button may only be actuated by users who have permission to create new channels. Accordingly, buttons are contemplated that retrieve various additional contextual parameters and pass these additional contextual parameters to one or more initiated workflows. It should be understood that additional buttons are contemplated, for example, to create new virtual spaces. For example, a button posted within a first virtual space may be tied to a workflow for creating a second virtual space, which may be any of a direct message, a channel, a collaborative document, or a collaboration session.

In some embodiments, the buttons template tab 806 may be used to access one or more preconfigured button templates. The preconfigured button templates may be used to generate new buttons based on a preset button template. In some embodiments, custom buttons may be added as templates such that a user can select an existing button as a template and tweak various parameters for the existing button to create a new altered button. In some embodiments, the user may be able to edit or change existing buttons, for example, by changing the workflows associated with each button.

In some embodiments, the user interface 800 may be configured to display one or more buttons stored in a buttons directory including all buttons associated with the user. For example, in some embodiments, any buttons used or created within a given user's organization may be included within the buttons directory. In some embodiments, the user interface 800 further comprises an import option 810 configured to import existing buttons from some external source. For example, the import option 810 may be used to import buttons from another organization or workspace. In some embodiments, the user interface 800 further comprises a create option 812 that may be used to create a new button.

In some embodiments, selection of the create option 812 causes display of button configuration modal such as the button configuration modal 510, as shown in FIG. 5B.

In some embodiments, buttons may be copied and pasted within various contexts of the group-based communication system. For example, a user may copy a button from the button page and paste the button within a channel, canvas, collaborative document, or direct message channel. Further, embodiments are contemplated in which buttons may be copied and pasted directly between two different contexts. For example, a button may be copied from one channel and posted within another channel. Similarly, in some embodiments, buttons may be copied from a channel and posted within a collaborative document or any other suitable context of the group-based communication system. Additionally, in some embodiments, buttons may be dragged and dropped into various contexts within the group-based communication system. For example, in some embodiments, buttons may be accessed from a shortcut menu or sidebar and then selected and dragged into the desired context such as a channel or collaborative document.

In some embodiments, the button page 802 further allows users to access and change the workflows themselves. For example, in some embodiments, the button page 802 allows users to edit, remove, and add workflow steps to a workflow associated with a given button. In some embodiments, changing workflow steps may cause a workflow copy of the workflow to be generated that is augmented with the changes such that the workflow is not affected elsewhere in the group-based communication system and will only be changed with respect to a specific button.

In some embodiments, buttons may be configured directly prior to posting within the group-based communication system. Further, in some embodiments, buttons may be set up and configured ahead of time. Accordingly, a plurality of buttons and button templates may be stored within the button directory as described herein. Further still, in some embodiments, buttons may be configured ahead of time and stored in the button directory and then further edited just before being posted. For example, the button configuration modal 510 may be presented to a user before a button is posted such that the user can edit various parameters of the button (and in some embodiments, the associated workflow) before posting.

In some embodiments, personalized button directories or button libraries may be generated for each user of the group-based communication system. Here, the personalized button directories may be automatically generated based on previous user activity or manually customized by the users. For example, in some embodiments, a button library may be accessible to each user comprising a list of buttons which that user has recently used. Further, in some embodiments, users may be able to manually customize their button library by adding and removing buttons. For example, a user may be able to add and/or remove buttons from the list of available buttons 808. Accordingly, embodiments are contemplated in which personally customizable button directories are provided and stored for each user. For example, in some embodiments, the personalized button directories may be stored within a data store associated with the group-based communication system. In some embodiments, machine learning may be employed to suggest buttons for placement in a given context from a user's button library. Similarly, when configuring a placed button, machine learning may be employed to suggest configuration parameters based on previous placement of the placed button (or other buttons) by the user (or by other users).

Contextual Automation

Figure 9A:
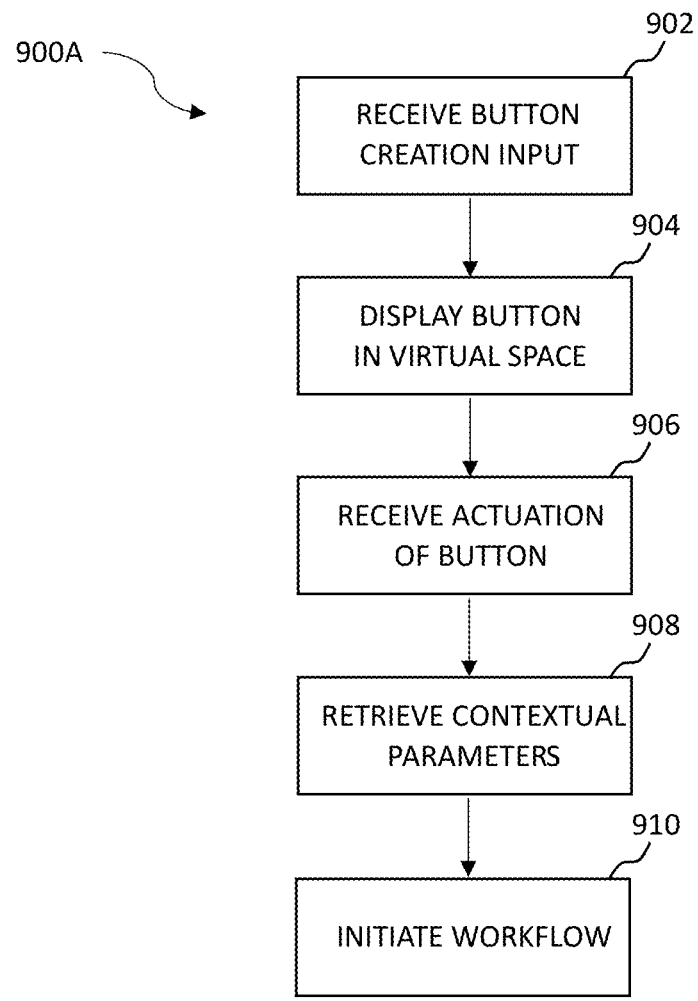
FIG. 9A illustrates an exemplary method for contextual automation within a group-based communication system relating to some embodiments.

FIG. 9A illustrates an exemplary method 900A for contextual automation within the group-based communication system relating to some embodiments of the invention. In some embodiments, any number of the steps described herein may be performed using various different suitable techniques. For example, in some embodiments, one or more steps of the method 900A may be carried out using a processor to execute computer readable instructions stored within a computer-readable media. Further still, in some embodiments, processing may be divided, for example, such that a first processor performs a first portion of steps, and a second processor performs a second portion of steps.

At step 902 a button creation input is received. In some embodiments, the button creation input may be received within a virtual space of the group-based communication system. For example, the button creation input may be received within the context of a specific channel or a specific collaborative document. In some embodiments, the button creation input comprises a user selection, for example, a user typing a slash command, selecting a button from a shortcut menu, or selecting a button from within a buttons directory. However, it should be understood that many additional means of receiving button creation inputs are also contemplated. In some embodiments, various parameters of the button may be configured as part of the button creation input. For example, a user may select one or more workflows to be associated with the button, as well as other button parameters, such as what values are passed to the workflow.

At step 904 the button may be displayed within the virtual space based on the received button creation input. In some embodiments, displaying the button within the virtual space comprises displaying the button within a specific channel, collaborative document, or another suitable context within the group-based communication system. In some embodiments, buttons may be posted and displayed within any of channels, documents, direct messages, canvases, or communication sessions. For example, in some embodiments, a button may be shared and persisted within the context of a synchronous multimedia collaboration session such that the users participating in the synchronous multimedia collaboration session are able to select the button.

In some embodiments, the button may be displayed based at least in part on the context of the virtual space. Further, in some embodiments, the button may be displayed based at least in part on the associated workflow tied to the button. Accordingly, embodiments are contemplated in which at least one display parameter of the button is determined based on the context of the virtual space and data received from the associated workflow. For example, in some embodiments, a button display theme may be selected for the button based on the channel in which the button is posted. Accordingly, the theme of the button may be configured to reflect the theme of the context in which the button is persisted within the group-based communication system. In some embodiments, such a theme may determine display parameters such as, for example, border size, border shape, and border color, as well as font, font size, and font color for the button. Further still, embodiments are contemplated in which one or more selection options for the button may be determined based on the context of the virtual space. For example, in some embodiments, an employee of the month voting button is contemplated. Here, the voting button may be configured to automatically retrieve and display each of the channel member names as selection options of the voting button.

Additional buttons are contemplated that may be displayed based on specific contextual parameters. In some embodiments, selection options of a button may be determined and displayed, for example, based on channel parameters such as an associated location. For example, if a specific channel is associated with a geographical location of a physical office, selection options may be determined based on the geographical location. Accordingly, in some embodiments, a lunch voting button is contemplated that automatically provides selection options for caterers within the vicinity of the geographical location associated with a specific channel of the group-based communication system.

In some embodiments, one or more display parameters of the button may be determined based at least in part on the associated workflow for the button. For example, in some embodiments, the display of the button may change depending on the progress of the associated workflow. Here, an initial display of the button may be updated while the workflow is being executed and may be updated again once the workflow is completed. Further, embodiments are contemplated in which an indication of the workflow may be displayed along with the button in the virtual space.

At step 906, an actuation of the button is received. In some embodiments, the actuation is received from a user, for example, from the user clicking, tapping, or otherwise selecting the button within the virtual space. It should be understood that the button, as described herein, may comprise multiple components. For example, in some embodiments, the button may comprise any combination of a button description along with various selectable options. Further, in some embodiments, the button may be expandable such that various additional information and selection options are presented after actuation or interaction with the button.

Further embodiments are contemplated in which buttons may be actuated automatically. For example, a button may be actuated using a workflow. In some embodiments, buttons may be actuated based on any number of internal and external triggers. For example, an external application may actuate a button within the group-based communication system using a webhook or API. Further still, buttons may be actuated by triggering events from within the group-based communication system such as by any combination of user interaction or automation. Embodiments are contemplated, for example, in which buttons may be actuated based on a user viewing the button within a display associated with the group-based communication system. Further still, in some embodiments, buttons may be actuated, for example, based on a user sending a message or some other internal event within the group-based communication system.

At step 908 one or more contextual parameters are retrieved. In some embodiments, the contextual parameters may be retrieved responsive to receiving the actuation of the button. In some embodiments, the contextual parameters comprise a user identifier associated with a specific user and a contextual identifier associated with the virtual space in which the button persists. Further, in some embodiments, two or more user identifiers may be retrieved. For example, a user identifier may be retrieved for the user who actuates the button, as well as a user identifier for the user who created the button or posted the button within the virtual space.

At step 910 a workflow associated with the button is initiated. In some embodiments, the workflow may be initiated responsive to the actuation of the button. Further, in some embodiments, the workflow may be executed contextually such that at least one the workflow operation is performed based on the one or more contextual parameters.

For example, in some embodiments, workflow operations may be performed based on the retrieved user identifiers and/or contextual identifiers. In one example, a channel identifier associated with the channel in which the button is posted may be passed to the workflow and used within at least one step of the workflow. For example, the workflow may be configured to post a message within that channel or to share a document link within the channel to an automatically generated document associated with the workflow. It should be understood that this is just one example use case of a contextual workflow and that a variety of other contextual applications are also contemplated. For example, workflows may be configured to perform operations based on the specific user identifiers associated with the button.

Further still, embodiments are contemplated in which additional information may be retrieved based on the contextual parameters. For example, user information may be retrieved based on a user identifier from various internal or external data sources. In one example, a workflow may be configured to retrieve user information associated with a user who clicks on a button within the virtual space and add this user information to a document or data table.

In some embodiments, the operations of the workflow may include any combination of internal and external operations with internal operations including steps carried out within the group-based communication system and external operations including steps carried out on one or more external applications or services. For example, a single workflow may include a first portion of steps performed natively within the group-based communication system and a second portion of steps performed within an external application. Further, workflows may be included that are entirely hosted within the group-based communication system or entirely executed on one or more external sources. In one example, a workflow may be initiated from within the group-based communication system, for example, by a user selecting a button, but the operations of the workflow may be performed elsewhere on an external application, such as, updating values within an external remote data table. In some embodiments, allowing workflows to be implemented both internally and externally allows users to achieve various functionalities without incorporating or creating devoted applications. For example, where in some cases, a devoted application would be used to perform an action based on information received from the group-based communication system, a combination of buttons and workflows may be sufficient to achieve the same functionality without requiring generation of an entire separate application. Further, using contextual buttons to trigger workflows allows activity to be triggered outside of the group-based communication system without requiring users to exit the group-based communication system interface.

Figure 9B:
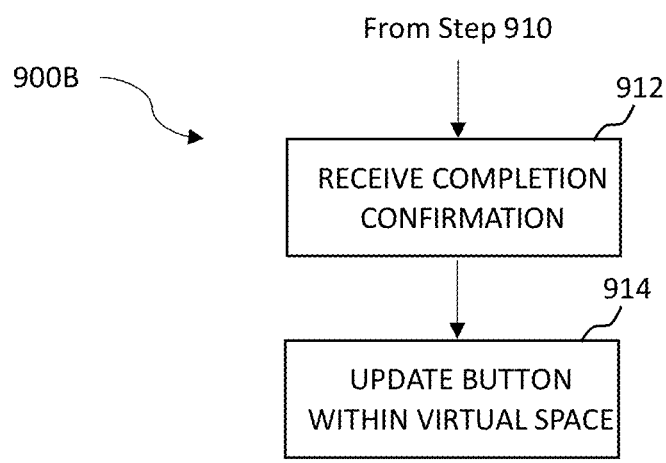
FIG. 9B illustrates an exemplary continued method for contextual automation within a group-based communication system relating to some embodiments.

FIG. 9B illustrates an exemplary continued method 900B relating to some embodiments of the invention. In some embodiments, the steps of the method 900B may be optionally included after the method 900A described above. For example, in some embodiments, after initiating the workflow at step 910, a completion confirmation may be received at step 912. In some such embodiments, the completion confirmation may be associated with completion of the initiated workflow. For example, the completion confirmation may be submitted in response to a determination that one or more operations of the workflow have been successfully carried out.

At step 914 the button may be updated within the virtual space. In some embodiments, updating the button may comprise replacing the button with a message or with another button, as described above, removing the button, or changing various aspects of the button based on the completion confirmation from the workflow. For example, in some embodiments, the button description or the selection options may be automatically changed based on the workflow or on other external information. For example, in some embodiments, the selection options of the button may be updated based on information from a data table either natively or externally stored.

Embodiments are contemplated in which users may be able to share workflows by posting buttons within the group-based communication system. For example, if a first user wants to share a given workflow with a second user, the first user may paste a button associated with the workflow within a direct message to the second user. Accordingly, the second user will be able to copy and paste the button for later use or select the button in order to activate the workflow. Alternatively, if the first user wishes to share the workflow with a plurality of other users, the button may be posted within a channel of the group-based communication system. Accordingly, the buttons provide an additional means of sharing workflows within the group-based communication system.

Having thus described various embodiments of the invention, what is claimed as new and desired to be protected by Letters Patent includes the following:

1. One or more non-transitory computer-readable media storing computer-executable instructions that, when executed by at least one processor, perform a method of contextual automation within a group-based communication system, the method comprising:
   causing display of a workflow button within a virtual space of the group-based communication system to a user of the group-based communication system, at least one display parameter of the workflow button being determined based on a context associated with the virtual space, the context associated with the virtual space dictating at least one of an appearance of the workflow button or a functionality associated with the workflow button, such that the at least one of the appearance or the functionality is different than one or more other workflow buttons included within one or more other virtual spaces of the group-based communication system;
   receiving input relating to a modification to the at least one display parameter of the workflow button;
   updating, based on the input, the at least one of the appearance or the functionality associated with the workflow button;
   receiving, from the user, an actuation of the workflow button;
   responsive to the actuation of the workflow button, receiving a plurality of contextual parameters associated with the workflow button including a user identifier associated with the user and contextual data associated with the virtual space;
   initiating an associated workflow associated with the workflow button to perform one or more automated operations based on the plurality of contextual parameters;
   receiving a response indicative of a completion of the associated workflow; and
   updating the workflow button within the virtual space of the group-based communication system based on the response indicative of the completion of the associated workflow.

2. The one or more non-transitory computer-readable media of claim 1, the method further comprising:
responsive to performing an operation of the one or more automated operations, initiating an additional workflow to perform one or more additional operations;
receiving a completion confirmation associated with the additional workflow; and
performing a further operation of the one or more automated operations dependent on the completion confirmation associated with the additional workflow.

3. The one or more non-transitory computer-readable media of claim 1, the method further comprising:
responsive to performing an operation of the one or more automated operations, causing display of a new workflow button within the virtual space, wherein the new workflow button is configured to initiate an additional workflow.

4. The one or more non-transitory computer-readable media of claim 1, the method further comprising:
causing display of the workflow button within a second virtual space to a second user of the group-based communication system, the at least one display parameter of the workflow button in the second virtual space being different from the at least one display parameter in the virtual space;
responsive to the actuation of the workflow button in the second virtual space, retrieving the plurality of contextual parameters associated with the actuation of the workflow button including a second user identifier associated with the second user and a second contextual identifier indicative of the second virtual space;
determining a second workflow for the workflow button based on the workflow button and the plurality of contextual parameters, the second workflow being different from the associated workflow; and
initiating the second workflow.

5. A method for contextual automation within a group-based communication system, the method comprising:
causing display of a workflow button within a virtual space of the group-based communication system to a user of the group-based communication system, at least one display parameter of the workflow button being determined based on a context associated with the virtual space, the context associated with the virtual space dictating at least one of an appearance of the workflow button or a functionality associated with the workflow button, such that the at least one of the appearance or the functionality is different than one or more other workflow buttons included within one or more other virtual spaces of the group-based communication system;
receiving input relating to a modification to the at least one display parameter of the workflow button;
updating, based on the input, the at least one of the appearance or the functionality associated with the workflow button;
receiving, from the user, an actuation of the workflow button;
responsive to the actuation of the workflow button, receiving a plurality of contextual parameters associated with the workflow button including a user identifier associated with the user and contextual data associated with the virtual space;
initiating an associated workflow associated with the workflow button to perform one or more automated operations based on the plurality of contextual parameters;

receiving a response indicative of a completion of the associated workflow; and
updating the workflow button within the virtual space of the group-based communication system based on the response indicative of the completion of the associated workflow.

6. The method of claim 5, further comprising:
responsive to performing an operation of the one or more automated operations, creating a second virtual space based on the plurality of contextual parameters within the virtual space, wherein the second virtual space comprises a direct message, a channel, a collaborative document, or a collaboration session.

7. The method of claim 5, further comprising:
causing display of the workflow button within a second virtual space to a second user of the group-based communication system, the at least one display parameter of the workflow button in the second virtual space being different from the at least one display parameter in the virtual space;
responsive to the actuation of the workflow button in the second virtual space, retrieving the plurality of contextual parameters associated with the actuation of the workflow button including a second user identifier associated with the second user and a second contextual identifier indicative of the second virtual space;
determining a second workflow for the workflow button based on the workflow button and the plurality of contextual parameters, the second workflow being different from the associated workflow; and
initiating the second workflow.

8. The method of claim 5, further comprising:
responsive to performing an operation of the one or more automated operations, storing information indicative of a first one of the plurality of contextual parameters in a storage location determined based on a second one of the plurality of contextual parameters.

9. The method of claim 5, further comprising:
responsive to performing an operation of the one or more automated operations, updating the virtual space to reflect the actuation by the user of the workflow button.

10. A system comprising at least one processor and at least one non-transitory memory storing computer executable instructions that when executed by the at least one processor, perform a method for contextual automation within a group-based communication system, the method comprising:
causing display of a workflow button within a virtual space of the group-based communication system to a user of the group-based communication system, at least one display parameter of the workflow button being determined based on a context associated with the virtual space, the context associated with the virtual space dictating at least one of an appearance of the workflow button or a functionality associated with the workflow button, such that the at least one of the appearance or the functionality is different than one or more other workflow buttons included within one or more other virtual spaces of the group-based communication system;
receiving input relating to a modification to the at least one display parameter of the workflow button;
updating, based on the input, the at least one of the appearance or the functionality associated with the workflow button;
receiving, from the user, an actuation of the workflow button;

responsive to the actuation of the workflow button, receiving a plurality of contextual parameters associated with the workflow button including a user identifier associated with the user and contextual data associated with the virtual space;

initiating an associated workflow associated with the workflow button to perform one or more automated operations based on the plurality of contextual parameters;

receiving a response indicative of a completion of the associated workflow; and updating the workflow button within the virtual space of the group-based communication system based on the response indicative of the completion of the associated workflow.

11. The system of claim 10, the method further comprising:

responsive to performing an operation of the one or more automated operations, initiating an additional workflow to perform one or more additional operations;

receiving a completion confirmation associated with the additional workflow; and performing a further operation of the one or more automated operations dependent on the completion confirmation associated with the additional workflow.

12. The system of claim 10, the method further comprising:

responsive to performing an operation of the one or more automated operations, causing display of a new workflow button within the virtual space, wherein the new workflow button is configured to initiate an additional workflow.

13. The system of claim 10, the method further comprising:

responsive to performing an operation of the one or more automated operations, creating a second virtual space based on the plurality of contextual parameters within the virtual space, wherein the second virtual space comprises a direct message, a channel, a collaborative document, or a collaboration session.

14. The system of claim 10, the method further comprising:

responsive to performing an operation of the one or more automated operations, storing information indicative of a first one of the plurality of contextual parameters in a storage location determined based on a second one of the plurality of contextual parameters.

15. The one or more non-transitory computer-readable media of claim 1, wherein different ones of the one or more automated operations of the associated workflow are executed differently based on first characteristics associated with the user and second characteristics associated with the virtual space of the group-based communication platform at which the workflow button is disposed.

16. The one or more non-transitory computer-readable media of claim 1, wherein the appearance of the workflow button includes first content, the method further comprising, after receiving the actuation of the workflow button, updating the appearance of the workflow button to include second content that is different than the first content.

17. The one or more non-transitory computer-readable media of claim 1, wherein:

the user is a first user;

the appearance of the workflow button includes first content presented to the first user based on first characteristics associated with the first user; and the appearance of the workflow button includes second content, different than the first content, presented to a second user based on second characteristics associated with the second user.

18. The one or more non-transitory computer-readable media of claim 1, wherein:

the appearance of the workflow button is based on the associated workflow; and a first theme of the appearance of the workflow button is consistent with a second theme of the virtual space of the group-based communication platform at which the workflow button is disposed.

19. The one or more non-transitory computer-readable media of claim 1, wherein the appearance of the workflow button is based on a progress of the associated workflow.

20. The one or more non-transitory computer-readable media of claim 1, wherein:

the workflow button and other workflow buttons are stored within a button directory maintained by the group-based communication system; and prior to the display of the workflow button within the virtual space, receiving input to at least one of modify the at least one display parameter or associate one or more additional display parameters with the workflow button.

* * * * *